(12) United States Patent
O'Dell et al.

(10) Patent No.: US 6,956,968 B1
(45) Date of Patent: Oct. 18, 2005

(54) DATABASE ENGINES FOR PROCESSING IDEOGRAPHIC CHARACTERS AND METHODS THEREFOR

(75) Inventors: Robert O'Dell, Oakland, CA (US); Xiao Jun Wan, Beijing (CN); Changshi Xu, Calgary (CA)

(73) Assignee: Zi Technology Corporation, Ltd., Hamilton (BM)

( * ) Notice: Subject to any disclaimer, the term of this patent is extended or adjusted under 35 U.S.C. 154(b) by 570 days.

(21) Appl. No.: 10/053,876

(22) Filed: Jan. 18, 2002

Related U.S. Application Data

(63) Continuation-in-part of application No. 09/857,363, filed on Jun. 4, 2001, now Pat. No. 6,801,659, which is a continuation of application No. PCT/US00/00135, filed on Jan. 4, 2000.
(60) Provisional application No. 60/114,628, filed on Jan. 4, 1999.

(51) Int. Cl.$^7$ .................................................. G06K 9/18
(52) U.S. Cl. ................................ 382/182; 382/185
(58) Field of Search ........................ 382/177, 181, 382/182, 185, 218, 219, 224, 229; 715/535; 341/28; 345/467

(56) References Cited

U.S. PATENT DOCUMENTS

| | | | | |
|---|---|---|---|---|
| 4,379,288 A | * | 4/1983 | Leung et al. .................. 341/28 |
| 4,505,602 A | * | 3/1985 | Wong .......................... 400/110 |
| 4,879,653 A | * | 11/1989 | Shinoto ....................... 715/535 |
| 5,109,352 A | * | 4/1992 | O'Dell ........................ 715/542 |
| 5,212,769 A | * | 5/1993 | Pong .......................... 345/467 |
| 5,223,831 A | * | 6/1993 | Kung et al. ................. 340/7.56 |
| 5,257,938 A | * | 11/1993 | Tien ............................ 434/128 |
| 5,410,306 A | * | 4/1995 | Ye .............................. 341/28 |
| 5,475,767 A | * | 12/1995 | Du ............................. 382/185 |
| 5,579,408 A | | 11/1996 | Sakaguchi et al. |
| 5,586,198 A | * | 12/1996 | Lakritz ........................ 382/185 |
| 5,734,750 A | | 3/1998 | Arial et al. |
| 5,790,055 A | * | 8/1998 | Yu .............................. 341/28 |
| 5,831,636 A | * | 11/1998 | Merchant et al. ........... 345/467 |
| 6,052,482 A | | 4/2000 | Arial et al. |
| 6,801,659 B1 | | 6/2001 | O'Dell |
| 6,373,473 B1 | | 4/2002 | Sakaguchi et al. |
| 6,411,948 B1 | | 6/2002 | Hetherington et al. |
| 6,766,179 B1 | | 7/2004 | Shiau et al. |

FOREIGN PATENT DOCUMENTS

| | | | | |
|---|---|---|---|---|
| GB | 2100899 | 1/1983 | ......... G06F/03/023 |
| GB | 2161004 | 1/1986 | .......... H03M/11/00 |

OTHER PUBLICATIONS

Leon, N.H., *Character Indexes of Modern Chinese*, Institute of Asian Studies Monograph Series, No. 42, Curzon Press. (Physical copy of document furnished on Nov. 24, 2004).

(Continued)

*Primary Examiner*—Bhavesh M. Mehta
*Assistant Examiner*—Amir Alavi
(74) *Attorney, Agent, or Firm*—IP Strategy Group, PC

(57) ABSTRACT

A computer-implemented method for encoding a handwritten stroke set, each of the handwritten stroke set being representative of a constituent stroke of an ideographic character, to obtain an encoded input sequence. The method includes ascertaining a shape of a first stroke of the handwritten stroke set and ascertaining one of a location information and a size information pertaining to the first stroke. The method further includes assigning a first code to the encoded input sequence responsive to a determination of the shape of the first stroke and a determination of the one of the location information and the size information of the first stroke. The first code is predefined to represent the shape of the first stroke and the one of the location information and the size information of the first stroke. The first code is sufficiently unique to distinguish the first code from other codes representing other permutations of shape and the one of the location information and the size information of the first stroke.

33 Claims, 13 Drawing Sheets

OTHER PUBLICATIONS

Darragh J. J. et al. 'The Reactive Keyboard: A Predictive Typing Aid' http://pharos.cpsc.ucalgary.ca/Dienst/Repository/2.0/Body/ncstrl.ucalgary cs/1989–371–33/pdf. Originally published: Computer, US, IEEE Computer Society, Long Beach, CA vol. 23, vol. 11 Nov. 1, 1990. (Physical copy of document furnished on Nov. 24, 2004).

U.S. Appl. No.: 10/054,673, Title: Systems and methods for inputting ideographic characters, Filed: Jan. 1, 2002, First Inventor Name: O'Dell.

U.S. Appl. No.: 10/055,707, Title: Systems and methods for inputting ideographic characters using arbitrary element strokes, Filed: Jan. 22, 2002, First Inventor Name: O'Dell.

U.S. Appl. No.: 10/078,254, Title: Systems and methods for inputting ideographic characters using alternative language inputs, Filed: Feb. 15, 2002, First Inventor Name: O'Dell.

Masui T: 'An Efficient Text Input Method for Pen–Based Computers' CHI Conference Proceedings, Human Factors in Computing Systems, US, NY, NY: ACM, 1998, pp. 328–335. (Physical Copy of document furnished on Nov. 24, 2004).

* cited by examiner

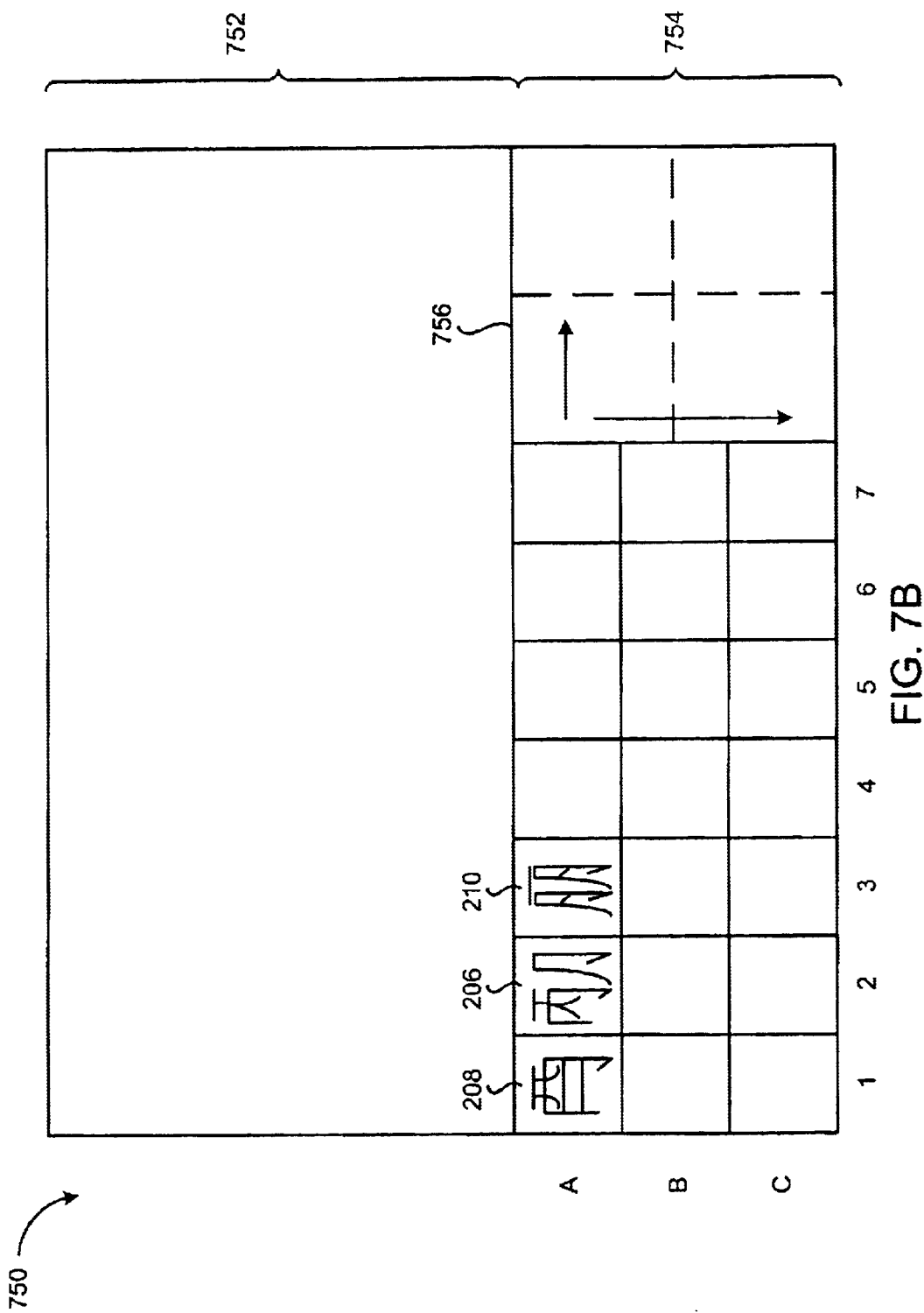

FIG. 9A VERTICAL
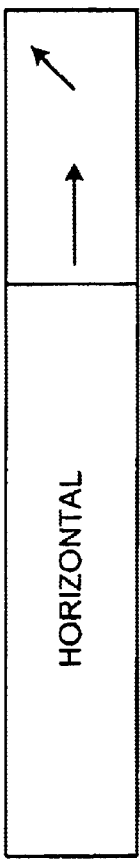
FIG. 9B HORIZONTAL
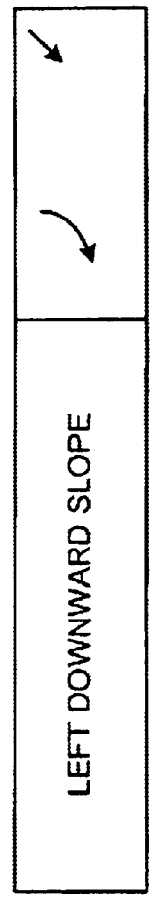
FIG. 9C LEFT DOWNWARD SLOPE
FIG. 9D RIGHT DOWNWARD SLOPE
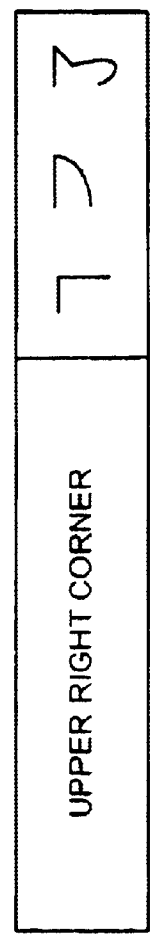
FIG. 9E UPPER RIGHT CORNER
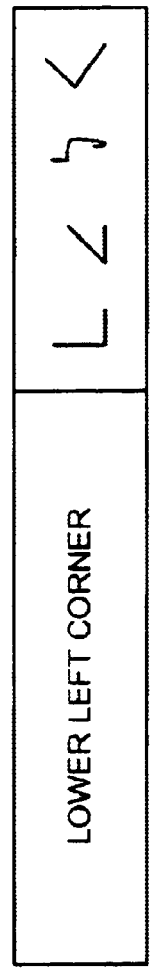
FIG. 9F LOWER LEFT CORNER

|  | SMALL | MEDIUM | LARGE |
|---|---|---|---|
| VERTICAL | a | D | A |
| HORIZONTAL | d | M | D |
| LEFT DOWNWARD SLOPE | g | N | G |
| RIGHT DOWNWARD SLOPE | b | P | B |
| UPPER RIGHT CORNER | e | R | E |
| LOWER LEFT CORNER | f | S | F |

| t | u | v | w | x | y | z |

FIG. 13B

| 1 | 5 | 6 | 7 | 8 | 9 | 0 |

DATABASE ENGINES FOR PROCESSING IDEOGRAPHIC CHARACTERS AND METHODS THEREFOR

This application is a continuation-in-part of U.S. patent application Ser. No. 09/857,363 entitled "Text Input For Ideographic And Nonideographic Languages", filed Jun. 4, 2001, now U.S. Pat. No. 6,801,659 which is a continuation of Application No. PCT/US00/00135 entitled "Text Input System For Ideographic And Nonideographic Languages", filed under the Patent Cooperation Treaty on Jan. 4, 2000, which was published under PCT Article 21(2) in English and claims priority from a U.S. Provisional Patent Application No. 60/114,628 entitled "Text Input System For Ideographic And Nonideographic Languages", filed Jan. 4, 1999.

BACKGROUND OF THE INVENTION

The present invention relates in general to computer-implemented systems and techniques for inputting and encoding characters, and in particular to computer-implemented systems for inputting and encoding ideographic characters, such as those used in the Chinese, Korean, or Japanese language.

The English language uses its 26 letter alphabet to construct several hundred thousand words in left to right linear groups of varying lengths and combinations of letters. Each letter is associated with a sound. Ideographic-based languages, such as Chinese, Korean, or Japanese are constructed differently. To simplify the discussion, the Chinese language will be discussed in great detail herein although it should be kept in mind that the discussions, techniques, and systems herein also apply to other ideographic-based languages, such as Korean or Japanese.

In Chinese, the most elementary unit in the language is said to be not an alphabet symbol but a "character"—a symbol which is usually equivalent to an English word. Chinese characters are composed of various combinations of up to over 30 different pen-strokes. These strokes are not, by themselves, associated with any sound (as are the symbols of the English alphabet), and when combined to form a character, the combination is pronounced differently according to dialects—even though universally read with the same meaning. While there are said to be as many as perhaps 50,000 characters, including ancient and very esoteric ones, most reasonably well-educated Chinese are familiar with no more than roughly 6,000 to 8,000 different characters. It has been estimated that 98% of written communication is done from a pool of only 3,000 different characters. This is not to say that most people use only a few thousand different "words", however. These characters are also commonly used in combinations of two or more to create more complex words or phrases. For example, the character for ten added to the character for moon forms a group of two characters which can mean October.

The major obstacle to creating a practical Chinese typewriter was that the strokes are not used in a linear fashion to construct characters, and the size, or—in the case of some strokes—even their proportions, vary greatly. Each character is constructed in an imaginary box of the same size as that of all other characters regardless of how many strokes are needed. This means that the same stroke can be of various lengths or various proportions as it is squeezed or elongated to fit into appropriate elements in various characters in the imaginary boxes. In order to construct a character, the needed strokes are all placed appropriately within the box—some must go in the middle, some left, some right, some on the bottom, some on the top, and some cut through the entire figure. In other words, there is no physical linearity, as with English in how the strokes are set down. However, there is a traditional time sequence and linearity to the strokes, which is taught in school and tends to be remarkably uniform from writer to writer.

With these differences, it is not surprising that a practical keyboard, which is, after all a device built for linear, alphabetic languages, could not be successfully adapted to Chinese. With all the up and down and back and forth movements, as well as all the various sizes and forms needed for building a character from strokes or elements, an enormous keyboard requiring thousands of keys or a very complicated keyboard would be needed to write with a one character or even a one element per key approach.

In the past, various attempts have been made to simplify the task of computer-implemented inputting and encoding ideographic characters. One of the more common approaches today for Chinese and Japanese are phonetic systems, which are time consuming to learn and to operate and are burdened with the problems of the subtle differences in pronunciation. The most prominent of these systems also require the use of an English keyboard and some familiarity with English pronunciation. There remains widespread dissatisfaction with these systems, however, and the search for a better solution continues.

Another approach employs computer-implemented handwriting recognition software. Using this approach, the entire character inputted would be recognized, using a statistics-based pattern recognition algorithm. This approach also has its limitations. Under this approach, the writer must write the character such that the difference between the character furnished to the recognition device and that employed as the reference in the computer memory is within a statistically acceptable range. As with most statistics-based systems, some writers will invariably write significantly differently from the majority and hence be outside of the portion of the bell curve of the statistical sample. For these writers, recognition accuracy will be poor. Even with the same writer, some written characters may be recognized well because they fall within the statistical envelope and others will be recognized poorly since the writer writes these latter characters significantly differently from the majority of the statistical sample.

Other exemplary approaches include that described by Robert O'Dell (U.S. Pat. No. 5,109,352, which also describes various other approaches in the background section), Li (UK Patent GB2100899), and an earlier system created by Jiang Zheng (Character Indexes of Modern Chinese, by N. H. Leon, Scandinavian Institute of Asian Studies Monograph Series, No. 42, Curzon Press), all incorporated by reference herein.

The above-discussed inputting and recognition problems are exacerbated when inputting is done with a hand-held device, such as a telephone (wired or wireless), a personal digital assistant (PDA) with an abbreviated keyboard or another form of data entry such as a proprietary key arrangement or a touch-sensitive writing area or display. This is because in these devices, there are severe limitations in the physical size of both the input and display subsystems, which limit the amount of space available for "writing" and for displaying the partial or full result. Irrespective of whether the computer-implemented device is desktop-based or hand-held, however, it is felt that additional improvements can be made to improve the speed and accuracy of ideographic character input and encoding, as well as to improve the ease with which a writer can rapidly achieve the accurate entry of the intended character from as few written strokes or keyed entries as possible.

SUMMARY OF THE INVENTION

The invention relates, in one embodiment, to a computer-implemented method for encoding a handwritten stroke set, each of the handwritten stroke set being representative of a constituent stroke of an ideographic character, to obtain an encoded input sequence. The method includes ascertaining a shape of a first stroke of the handwritten stroke set and ascertaining one of a location information and a size information pertaining to the first stroke. The method further includes assigning a first code to the encoded input sequence responsive to a determination of the shape of the first stroke and a determination of the one of the location information and the size information of the first stroke. The first code is predefined to represent the shape of the first stroke and the one of the location information and the size information of the first stroke. The first code is sufficiently unique to distinguish the first code from other codes representing other permutations of shape and the one of the location information and the size information of the first stroke.

In another embodiment, the invention relates to a computer-implemented method for obtaining a list of candidate selections that includes at least a first incomplete ideographic character and a first complete ideographic character from a database of complete ideographic characters and incomplete ideographic characters. Each of the complete ideographic characters and the incomplete ideographic characters in the database is associated with a respective one of a plurality of code sequences. Each of the plurality of code sequences represents information pertaining to shape, sequence, and one of stroke location information and stroke size information for strokes of one of the complete characters and incomplete characters in the database. The first incomplete ideographic character has an associated first code sequence stored in the database, and the first code sequence is one of the plurality of code sequences and representing information pertaining to shape, sequence, and one of stroke location information and stroke size information for strokes of the first incomplete characters. The first complete ideographic character has an associated second code sequence stored in the database, and the second code sequence is another one of the plurality of code sequences and representing information pertaining to shape, sequence, and one of stroke location information and stroke size information for strokes of the first complete ideographic character. The computer-implemented method includes receiving an encoded input sequence. The encoded input sequence represents information pertaining to shape, sequence, and one of stroke location information and stroke size information for a stroke set of a given character. The number of strokes in the stroke set is fewer than the number of strokes in the given character. The method also includes searching through the plurality of code sequences to find matched sequences. Each of the matched sequences represents one of the plurality of code sequences whose codes contain at least the encoded input sequence, wherein the first code sequence and the second code sequence are among the matched sequences. The method additionally includes obtaining the first complete character from the first code sequence as a first candidate selection in the list of candidate selections. There is also included obtaining the second incomplete character from the second code sequence as a second candidate selection in the list of candidate selections.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7B shows, in accordance with one embodiment of the present invention, one exemplary implementation on a portable electronic device having a touch-sensitive screen.

FIGS. 9A–9F depict, in accordance with one embodiment of the present invention, the six stroke shape categories of strokes used in the construction of Chinese characters.

FIG. 10 illustrates, in accordance with one embodiment of the present invention, an encoding scheme for the 18 possible combinations of Chinese stroke shapes and stroke sizes.

FIG. 13A illustrates, in accordance with one embodiment of the invention, an encoding scheme for code sequences utilizing location indices.

FIG. 13B illustrates, in accordance with another embodiment of the invention, an alternative encoding scheme for code sequences utilizing location indices.

DETAILED DESCRIPTION OF THE PREFERRED EMBODIMENTS

Figure 1:
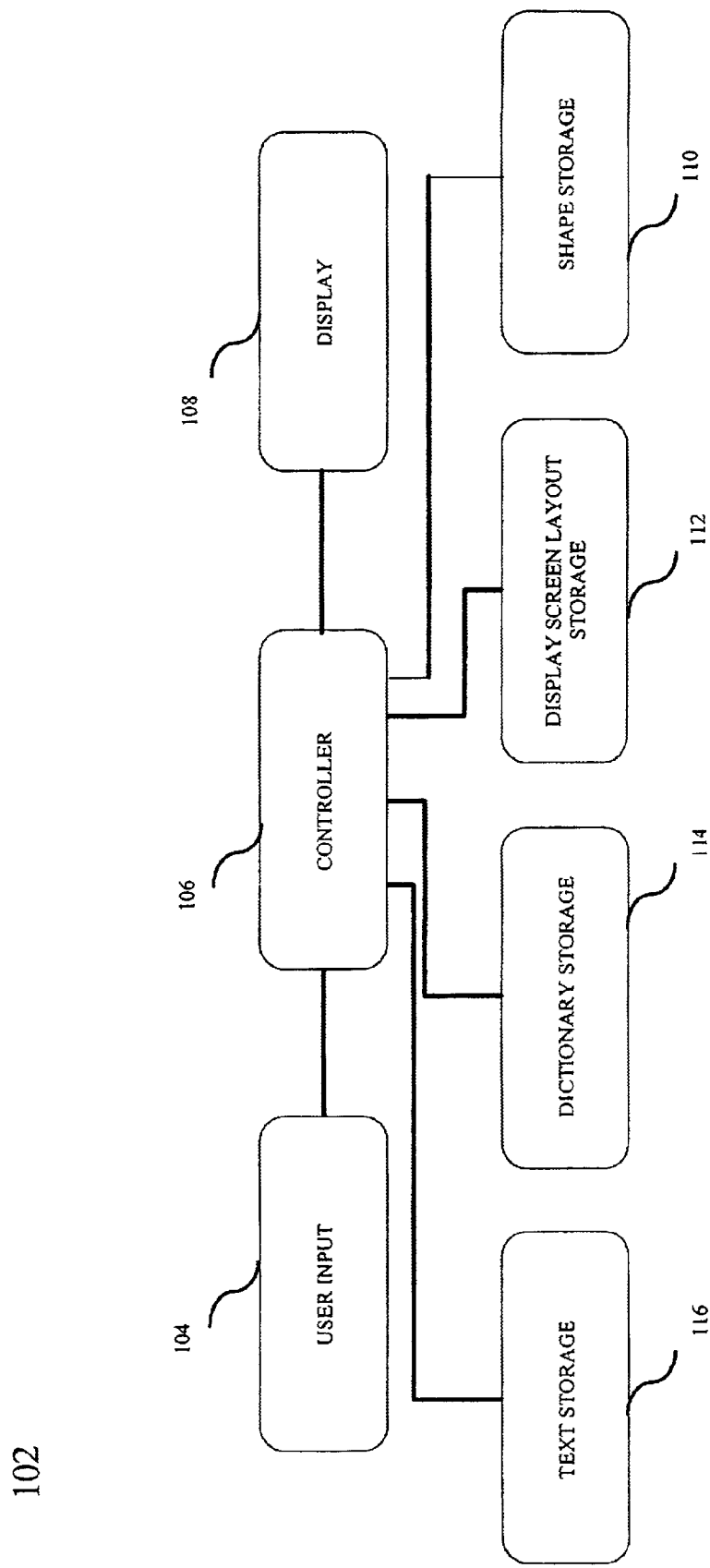
FIG. 1 shows an exemplary text input apparatus, representing a typical computer-implemented system that may be employed to input and encode ideographic characters.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the present invention, there are provided inventive techniques for inputting and encoding ideographic characters in a manner that is both efficient and natural to users. In one embodiment, initial handwritten input strokes are obtained from the user via a touch-sensitive input apparatus and subsequently categorized (i.e., classified or characterized) according to their shapes and sequence of input. In addition, one or both of a stroke's relative size and relative location may be employed in stroke categorization. The categorization of handwritten input strokes in this manner permits the database engine to more quickly and accurately narrow down the list of possible characters intended by the user.

In a preferred embodiment, only a few initial handwritten input strokes are categorized using shape/sequence and one or both of the strokes' relative size and the strokes' relative location data. Once these initial handwritten input strokes are categorized and result in a character-oriented categorization, a list of selections containing partial and/or complete characters obtained from the database responsive to the character-oriented categorization may be presented to the user. These selections represent the list of partial and/or complete characters that contain, in their combination of strokes, the handwritten strokes received and categorized. Because of the additional information provided by the strokes' relative size and location data, the list of selections presented to the user for selection tends to be smaller and more accurate than that obtainable without the use of the strokes' relative size and/or location data.

Because the invention employs user-input handwritten strokes to derive its first list of selections from the database, the user can advantageously enter text in the natural manner that s/he is familiar with using pen and paper. In accordance with another aspect of the present invention, there are also provided inventive data presentation and navigational techniques for allowing the user to receive appropriate inputs along the steps of the inputting process and to allow the user to rapidly pick his way through various lists of selections to arrive at the intended character. Because of the inherent space limitation on some handheld devices, there are provided, in accordance with one embodiment of the invention, data presentation techniques for maximizing the available display space during the display of the various lists of selections and for minimizing the number of commands that the user has to enter to obtain the intended character.

In accordance with one aspect of the present invention, the inventive technique for inputting and encoding ideographic characters is implemented in a computer-controlled device that is capable of receiving handwritten input (such as one equipped with a touch-sensitive input device). In terms of physical form factor, such computer-controlled devices may include desktop workstations or personal computers, television set top boxes or internet terminals, and portable consumer or office electronic equipment. The invention is particularly, but not exclusively, suitable for use in handheld devices such as cellular phones, personal digital assistants and pagers, and the like, due to the economical use of space for inputting strokes and commands, and for displaying partial or complete characters during the inputting process. When the invention is implemented in a handheld device, inputting of the handwritten strokes may be performed using, for example, a stylus upon a touch sensitive pad or screen.

FIG. 1 shows a text input apparatus 102, which includes a user input device 104 coupled to a controller 106, which in turn is coupled to a display 108. Controller 106 has access to data storage 110, 112, and 114 in which character/letter shapes, display screen layouts, and one or more dictionaries (i.e., databases of complete and incomplete characters) are stored, respectively. Controller 106 also has access to text storage 116 in which text messages composed by a user (not shown) may be stored.

The hardware components needed to implement apparatus 102 (e.g., a microprocessor or microcontroller, memory or other data storage, display, and user input device) are conventional and obtainable from numerous commercial sources. As mentioned earlier, the invention may be integrated into apparatus 102 having any form factor. Generally, such integration is accomplished by implementing the inventive technique in software to be loaded into and executed by apparatus 102 to control the functionality of its various subsystems. Alternatively, part or all of the inventive technique may be implemented in hardware, in the form of logic circuitry formed in one or more integrated circuits.

Figure 2:
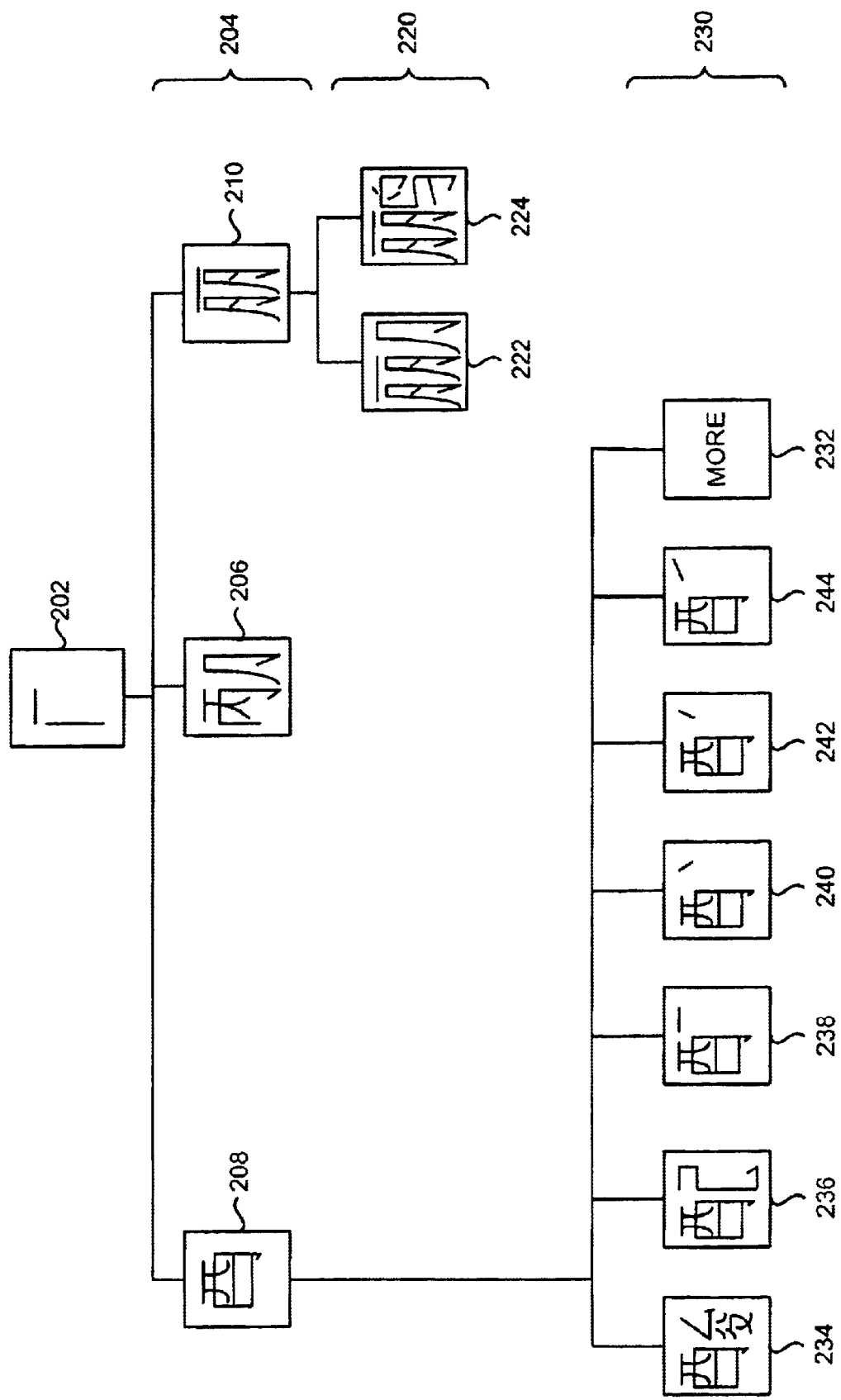
FIGS. 2–5 show, in accordance with one embodiment of the present invention, the initial handwritten input strokes and the various lists of selections that may be displayed to the user as a result of inputting the initial handwritten strokes and selecting among the list of selections displayed.

The invention may be more easily understood with reference to the example of FIG. 2. In the example of FIG. 2, stroke categorization is performed on the first two handwritten strokes input by the user. These input handwritten strokes are indicated by reference number 202 in FIG. 2. Preferably, as the user strokes through each stroke, the partial stroke is displayed and updated continuously to provide the user with immediate visual feedback pertaining to what has been received about each stroke. After handwritten stroke input is completed and stroke categorization is performed on the strokes entered, a list of selections 204 comprising incomplete and/or complete characters is presented. This list of selections is ascertained from a database module (i.e., dictionary), which ascertains from a database of complete and incomplete characters in the target language the candidate incomplete and/or complete characters that contain the two handwritten strokes entered. As discussed later herein, the lists of selections provide an advantageous "look-ahead" capability that substantially simplifies the character inputting process.

Preferably, the choices in list of selections 204 and in other lists subsequently presented (discussed below) are displayed in some order based on their respective frequency-of-use (which may be determined from a survey of a large amount of printed materials). Frequency-of-use may be based on the number of times a character (or characters in the case of an incomplete) associated with a choice presented may statistically be expected to appear. In some cases, frequency-of-use associated with a choice may also be context-based. For example, a given choice may appear very frequently at the start of a sentence but not as frequently as an adjective. If the current character the user attempts to input is an adjective, that choice may be given a lower frequency-of-use score than if context is not employed. Another example involves compound characters where two or more are combined to create a complex word (such as the case with the word "October," which is formed by combining the character for "ten" with the character for "moon"). With respect to ordering, the list of selections may, for example, be ordered from left to right based on diminishing frequency-of-use. This consistency in the presentation of choices furnishes frequency information to the user in a manner that is unobtrusive and easy to understand, which in turn aides the user in the selection of one of the choices.

An incomplete character may be thought of as a kind of "prefix" for complete characters. The analogy with English for these "prefixes" may be the group of letters "act," which in addition to being a complete word (i.e., the verb "act") is also the beginning of other longer words such as "action," "activate," "activity," "actor," "actress," "actual," "actualize," and "actuate." Note that there may be many levels of "prefix." For example, the group of letters "acti"

may be a deeper level of "prefix," which includes the eventual words "action," "activate," "activity," and excludes the words "actor," "actress," "actual," "actualize," and "actuate." In this example, the group of letters "act" may be thought of as a parent prefix and the groups of letters "acti" and "actu" may be thought of as its child prefixes. Keep in mind that a parent prefix and its child prefix may differ by one or more letter; there being no requirement that a parent prefix and its child prefix must differ by only one character. These incomplete words or "prefixes" are preferably ascertained in advance through such means as a survey of a large amount of printed materials and organized in the database for use in the inputting process.

In Chinese, for example, characters are analogous to words in the English language, and strokes are analogous to letters. Analogous to the English language example, incomplete characters formed from groups of strokes may be ascertained in advance through a survey of a large amount of printed materials and organized in advance in the database. Also analogous to the English language example, there may be multiple levels of incompletes or prefixes, with each level differing from the next by one or more strokes.

Referring back to FIG. 2, the two handwritten strokes entered (202) may be thought of as the group of letters "act" in our English example. By categorizing these two handwritten strokes in accordance to shape/sequence and one or both of location and size and using the categorized information to search the database, the first list of selections 204 is obtained. Additional details pertaining to the database aspect are discussed later herein.

List of selections 204 includes the complete character 206 (analogous to the complete verb "act" in our English example), and incomplete characters 208 and 210 (analogous to prefixes "acti" and "actu" in our English example). These incomplete characters or "prefixes" are preferably organized along with complete characters in a database in advance, along with their frequency-of-use information (which may be absolute and/or context-based as mentioned earlier). For efficiency purposes, the strokes in these incomplete and complete characters may be encoded for ease of sorting and searching through the database. Encoding may take into account stroke shape, stroke sequence, and one or both of a stroke's relative size and location.

If the user selects the complete character 206 at this point, the character input and encoding process is finished and the selected character 206 is moved into the text portion so that the input and encoding process may begin with a new character. On the other hand, if the user selects one of the incomplete characters (e.g., 208 or 210), a more detailed list of selections pertaining to the selected incomplete character is presented. For example, if the user selects the incomplete character 210, the list of selections 220 would appear, either additionally to list of selections 204 or more preferably in place of list of selections 204 in the display screen to save space. In this case, both choices 222 and 224 are complete characters, and the subsequent selection of either ends the character input and encoding process. If the user selects the incomplete character 208, the list of selections 230 is presented. List of selections 230 may in turn contain a mix of complete and incomplete characters, from which the user may further select.

Figure 3:
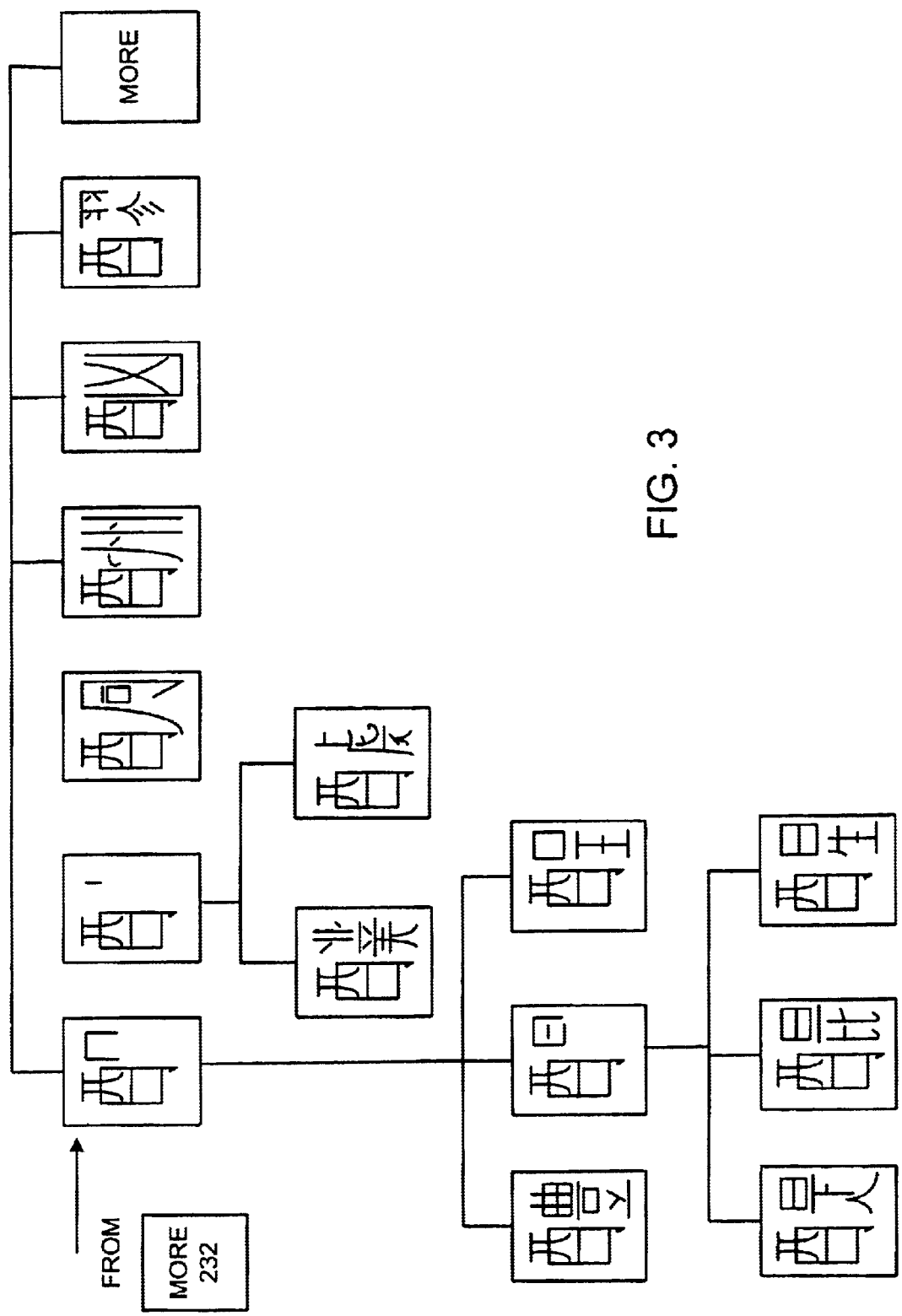

In list of selections 230, there is shown a selection "More" 232, representing the more-to-display choice that, if selected by the user, would cause additional selections to be displayed. The selections displayed after selection "More" 232 is selected are also children of incomplete characters 208. These selections are shown in FIG. 3. The use of the button "More" in a list of selections facilitates the economical use of the available display space as selections having a relatively low frequency-of-use may be hidden behind the button "More" 232, leaving the user to focus on the more frequently occurring selections 234–244 when the list of selections 230 is initially displayed. The selection "More" may be employed in any list of selections if it is desirable to display the more frequently occurring choices in a less cluttered manner or if there is simply insufficient space to display all the child selections associated with a given selected parent incomplete character.

Figure 4:
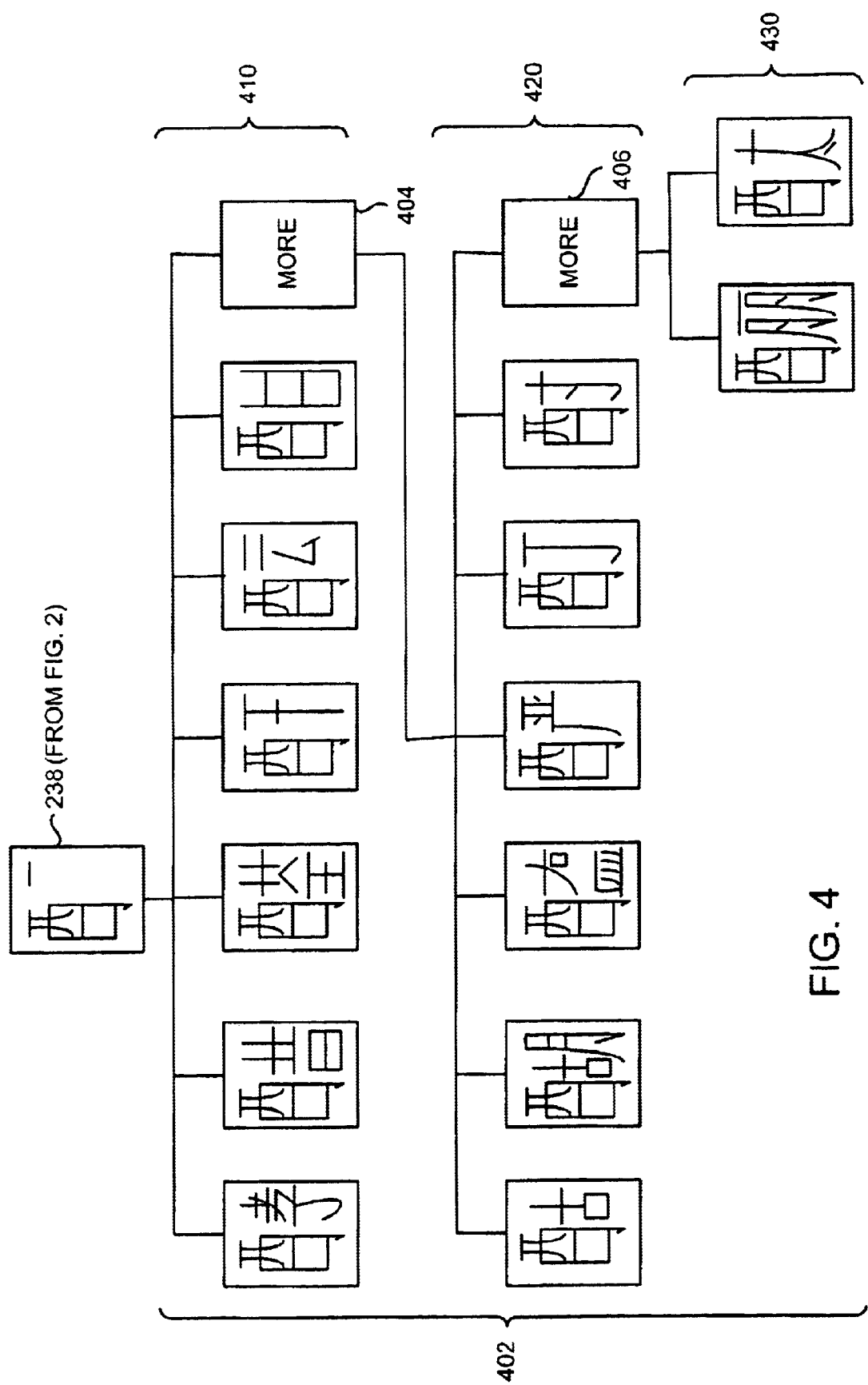

In list of selections 230, selections 234 and 236 are complete characters while selections 238–244 are incomplete characters. To further the example, FIG. 4 shows a list of selections 402, which are child selections of incomplete character 238 of FIG. 2. List of selections 402 is broken into three displayable groups 410, 420, and 430 by the use of the "More" selections 404 and 406. All the selections of list of selections 402 are complete characters, and the selection of any of them ends the character input and encoding process for the current character.

Figure 5:
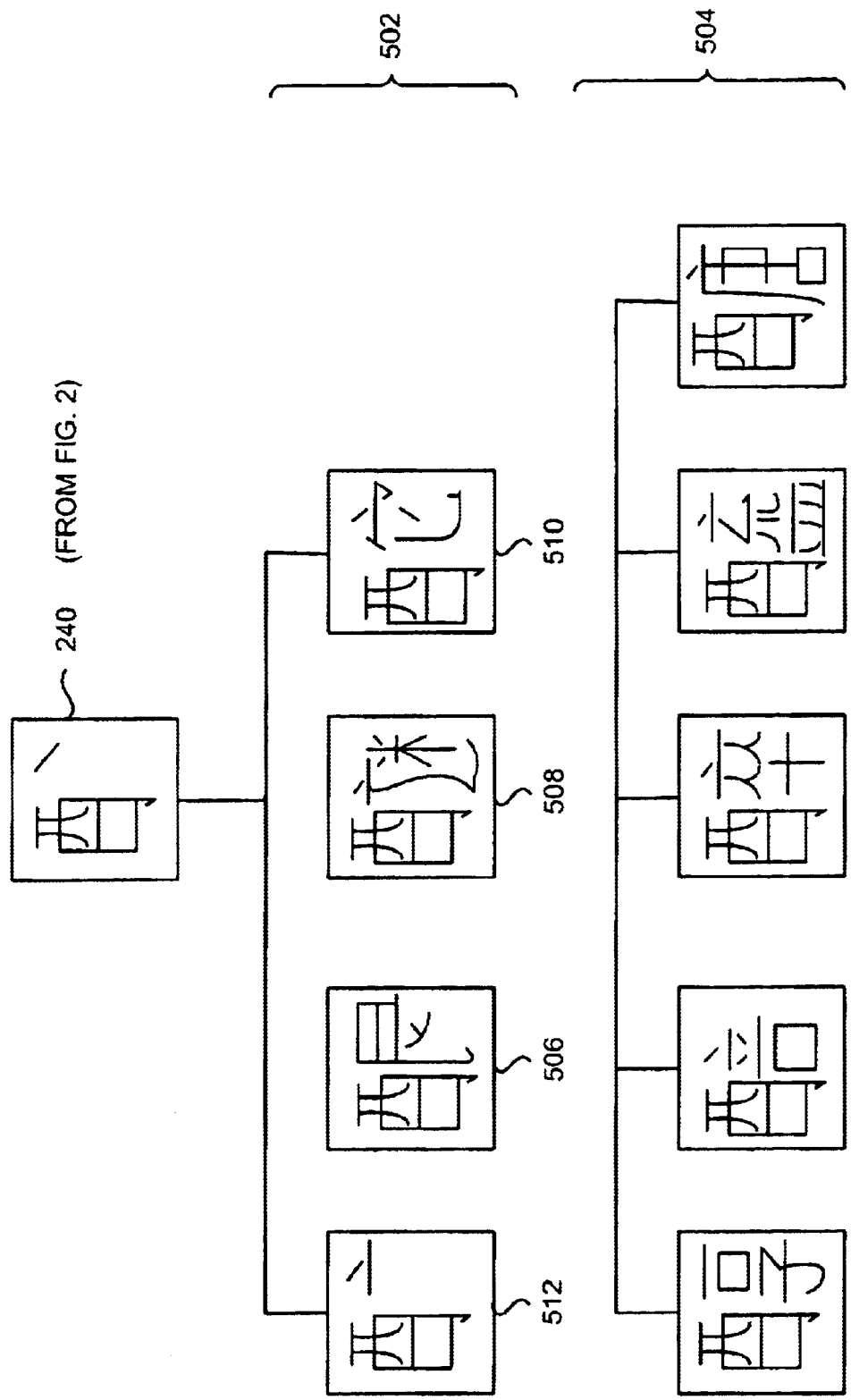

FIG. 5 shows a list of selections 502, which are child selections of incomplete character 240 of FIG. 2. List of selections 502 includes complete characters 506, 508, and 510 and an incomplete character 512. Selecting any of the complete characters ends the character input and encoding process for the current character. Selection of incomplete character 512 causes the additional list of selections 504 to be displayed. List of selections 504 contains all complete characters and the selection of any of these complete characters ends the character input and encoding process for the current character. The process of displaying additional lists of selections responsive to the selection of incomplete characters 242 and 244 in FIG. 2 proceed in an analogous manner.

It should be noted that by presenting the list of selections and allowing the user to choose one of the selections, the invention in effect provides a feedback mechanism to the user along the way. Thus, during the entry of a complex character, the presentation of the list of selections tells the user how well the current inputting step is proceeding. Each successful selection is an affirmation that the user is on his way toward the desired character. If the user does not see the desired selection in the list of selections presented, that may be an indication that the last step of inputting process was inaccurate. In this case, the user may hit a "back" button or enter via the touch sensitive surface a "back" command to return to the previous list of selections (and successively to backtrack step-by-step all the way back to the original handwritten stroke input step if the situation requires it) to try again.

Furthermore, the invention essentially removes from the user the burden of remembering how to enter all of the intricate strokes of a complex character and the sequence with which the strokes must be entered. The user starts the process by providing a few initial handwritten strokes and subsequent lists of selections, each having more strokes than the last list, "prompt" the user to select his way toward more complex incomplete and complete characters. This "look-ahead" paradigm is highly useful for infrequently used and/or complex characters and/or to resolve possible uncertainty, since it does not rely solely on data already inputted to come up with the list of selections. Thus, as the user enters the first few strokes or makes a selection, the list of selections displayed essentially communicates "Based on what you entered or selected, these are the next likely candidate incomplete and complete characters that you may intend. Please choose one to move to the next step." Note that this is different from a list of selections without the look-ahead capability (i.e., selections which do not include more strokes than what the user already entered but simply present variations of what the user already entered). In the latter case, the list of selections is simply for clarification purposes and not predictive of what the user may want to input, and the user is still burdened with having to provide from his own memory the next stroke in the appropriate sequence.

It should be borne in mind that although the above-discussed implementation (i.e., one involving categorizing after the receipt of 2 handwritten strokes) works reasonably well for Chinese, Korean, and Japanese, stroke categorization may be performed after any number of input handwritten strokes is received; there being no requirement that the number of input handwritten strokes must be two for the invention to work. In one aspect of the present invention, the number of input handwritten strokes required to derive the first list of selections is limited to a reasonable number so as to not burden the user with the need to input via handwriting an excessive number of handwritten strokes.

In accordance with a preferred embodiment, however, it has been found that if stroke categorization is performed after two strokes are received, an optimum level of performance is advantageously achieved. If categorization is performed after only one stroke is received, the number of candidate complete and incomplete characters to choose from is rather large, which makes it less user-friendly since the user may have to make a large number of selections through a larger hierarchy of lists in order to come up with the desired character. If categorization requires three or more strokes, the level of accuracy required from the user increases, which may decrease the level of user-friendliness of the system. In practice, it is found that the vast majority of Chinese characters can be obtained after the entry of two hand-written strokes and choosing one or two candidate characters presented in the subsequently displayed list(s) of selections.

Figure 6:
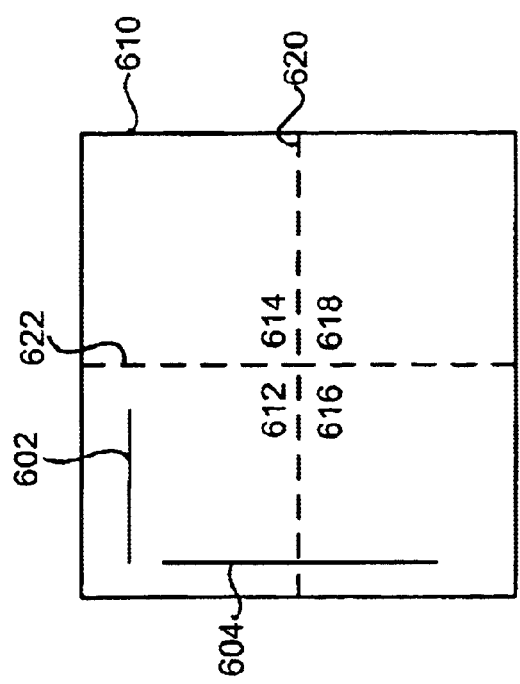
FIG. 6 shows, in accordance with one embodiment of the present invention, one technique for receiving and encoding the two exemplary input strokes of FIG. 2 in a manner so as to also take into account the relative size and location data

FIG. 6 shows one technique for receiving and encoding the two exemplary input strokes of FIG. 2 in a manner so as to also take into account the relative size and location data. In Chinese, Korean, or Japanese or most other ideographic characters, each character is entered stroke-by-stroke within the confine of an imaginary box and follows a fairly well-established sequence. Each stroke may have a different shape and may be entered in a specific order following some strokes and preceding others. By way of example, the strokes in FIG. 6 are entered with a stroke 602 (horizontal shape), followed by a stroke 604 (vertical shape). If the horizontal shape is encoded with the letter "A" and the vertical shape is encoded with the letter "B," encoding of the two strokes of FIG. 6 with purely shape and sequence information would result in the encoded string [AB]. Other shapes, such as a downward slanting stroke, an upward slanting stroke, a compound stroke made up of a horizontal and vertical shape, and the like, can be similarly encoded. Obviously, such encoding is language-specific. Different encoding schemes are certainly possible and in general, encoding can be performed by associating any stroke or even group of strokes with a unique code. An exemplary encoding scheme using numbers for strokes and groups of strokes is discussed in U.S. Pat. No. 5,109,352, incorporated by reference herein.

In accordance with one aspect of the invention, the relative size and location information associated with the input handwritten stroke is also received and encoded. Relative size and location information is available since the input strokes are handwritten. It is also contemplated, however, that the inputting of the initial strokes may also be performed using some form of keyed entries with the user specifying during the entry process the location and/or size information. In the preferred embodiment, the entry of the initial strokes is however performed upon a touch sensitive surface (e.g., screen or pad). In this case, the outline of the text entry "box" 610 is preferably shown to the user to assist the user in the placement of the strokes. In one embodiment, imaginary box 610 is logically divided into four quadrants 612, 614, 616, and 618. Lines 620 and 622 may optionally be shown to the user to assist the user in the placement of strokes. Of course imaginary box 610 may be divided into as many sectors as desired, with finer divisions giving more information about the location and size of the strokes. Ultimately, the divisions may be as finely granulated as the input granularity of the touch sensitive input surface.

In one embodiment, all beginning strokes are classified by the following characteristics: size (small, medium, or large), location (upper right corner, lower right corner, upper left corner, lower left corner), and shape (horizontal, vertical, slant down right, slant down left, and others). Since there is most likely some degree of variation among users when entering a given stroke, it is preferred that the quantification of a stroke size (e.g., large, medium, small) be performed within a degree of accuracy that factors in these variations. By way of example, instead of requiring a large stroke to be exactly 70% of the width or height of imaginary box 610 and a medium stroke to be exactly 40%, a large stroke may be categorized, for example, as any stroke that is longer than 60% of the width (or height) of imaginary box 610, a medium stroke may be categorized as any stroke that is between 20%–60%, and a small stroke may be categorized as any stroke that is less than 20%. Strategies such as statistical filtering may be employed to decide borderline cases.

Of course the percentages mentioned above may be varied as needed for a specific language or even among users of a given language. For example, if a user logs in and it is recognized that this user consistently draws a medium stroke longer than other users, the information about which may be learned from earlier sessions, the percentage threshold may be adjusted accordingly. Alternatively or additionally, the user may be asked to write some calibrating strokes or characters prior to actual text entry to determine how that particular user would enter a long stroke, a medium stroke, a short stroke, and the like. This information may then be employed to improve the accuracy with which entered strokes are categorized.

In the example of FIG. 6, stroke sizes are categorized into three size categories: large, medium, and small. However, it is also possible to have a greater number of size categories, such as extra-large, large, large-medium, medium, medium-small, small, etc. The greater number of size categories helps narrow down the list of possible selections (e.g., list 204 of FIG. 2) more quickly at the expense of requiring the user to be more accurate in stroking the strokes. Thus, a balance is needed and in one embodiment, three size categories appear satisfactory for Chinese character entry.

Other ways of capturing the stroke size information may rely, for example, on the coordinates (x,y) of the starting point and ending point, the summing of short segments along the stroke (which is useful for compound strokes having at least one change of direction during writing), or information pertaining to the sectors/quadrants that the stroke begins and ends. The point is that the size information is captured in a way that is useful in narrowing down the list of selections (204 in FIG. 2), and in a manner that does not impose an excessive accuracy requirement on the user during stroke input.

Relative location information may analogously be captured. For example, a stroke's relative location may be captured simply by noting the quadrants or sectors it occupies. In this manner, stroke 602 of FIG. 6 may be encoded as being in quadrant 612, and stroke 604 may be encoded as being in quadrants 612 and 616. The encoding of these two strokes to include the relative size and location information may, for example, take the form of the string of codes [A(medium,612), B(medium, 612–616)]. An alternative encoding scheme may be, for example, [Aa(612), Bb(612–616)]wherein the combination "Aa" signifies a stroke shape "A" of medium size (and analogously, the combination "AA" may signify a stroke shape "A" of large size and the combination "aa" may signify a stroke shape "A" of small size). Since the database of incomplete and complete characters is encoded in a similar manner, the string of codes representing the input handwritten characters may be employed to search through the database to come up with a list of candidate selections for the user to choose. From that point on, the process of character input becomes essentially a process of progressively selecting the appropriate incomplete or complete characters toward the intended character in the manner described in connection with FIG. 2.

In accordance with yet another embodiment of the invention, additional information pertaining to each stroke may be obtained to facilitate more precise categorization. Additional information may include the ratio of rise-to-run of a given stroke, more detailed information pertaining to each segment of a compound stroke, and the like.

In accordance with one aspect of the present invention, after the first few handwritten strokes are received and categorized, one or more of the location, size, or sequence information may be ignored, either automatically or upon request by the user, for subsequent strokes. As another embodiment, the user can enter as many strokes as desired, and be furnished with a mechanism (e.g., a button to be pushed or a command to be entered) to indicate when handwritten input is finished and the list of selections should be obtained from the input handwritten strokes. For some users, this may make the process more efficient when a complex character is intended and the user may know more about the character than just two or three or four initial strokes. As a general principle, additional strokes and/or more detailed information about each stroke helps narrow down the list of selections to be displayed quicker, albeit at the risk of filtering out the desired selection if the handwritten strokes are inaccurately entered. Thus a balance is desired with regard to the number of handwritten strokes that should be entered prior to obtaining the first list of selections, and this balance varies language-to-language and even user-to-user (based on how carefully he can enter strokes or how extensive his memory or knowledge is of the characters in the language).

In yet another embodiment, each handwritten input stroke may be checked for the existence of "editing" prior to categorization. By way of example, the user may be allowed to "shorten" or "erase" part of a stroke by entering a specific stroke that modifies the previous stroke (such as making an erasing motion or another unique motion on the touch sensitive input surface over a portion of a previously entered stroke that the user wishes to "shorten" or "erase").

Analogously, a given system may be configured to allow the user to lengthen an existing stroke by adding a segment to the existing stroke even after the existing stroke has already been entered (e.g., by providing a certain amount of overlap, for example). The additional segment may be in the same direction or in a different direction from the existing stroke. This editing information may be employed to finalize the stroke prior to categorization.

Figure 7A:
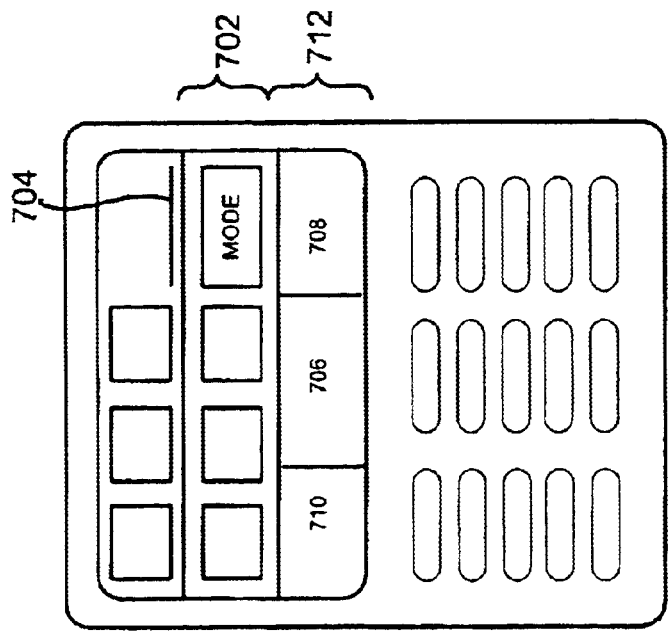
FIG. 7A shows, in accordance with one embodiment of the present invention, one exemplary implementation on a cellular phone having a touch-sensitive screen.

With regard to physical implementation, FIG. 7A shows one exemplary implementation on a cellular phone having a touch-sensitive screen. In FIG. 7A, the text area is shown by reference number 702, with the current character to be inputted indicated by reference number 704. Handwritten entry of strokes may be performed within the imaginary box indicated by reference number 706. Additional command buttons may be implemented in touch sensitive areas 708 and 710. The lists of selections are provided in area 712. Note that only the area within box 706 is required to be implemented with touch-sensitive capability. The area 712 employed to display the list of selections may be touch-sensitive to facilitate selection, or selection may be performed using buttons implemented elsewhere on the cellular phone (e.g., rocker buttons or discrete buttons associated with each position in area 712). Similar implementation options exist with respect to areas 702, 708, and 710.

FIG. 7B shows, in accordance with one preferred embodiment of the present invention, one exemplary implementation on an electronic device having a touch sensitive screen. With reference to FIG. 7B, a suitable electronic device such as a personal digital assistant (PDA), a personal computer (laptop or desktop), a workstation, a terminal (portable or desktop), a wireless or cellular telephone, or any other electronic device, has an associated display screen 750, which includes a display area 752 and a touch-sensitive area 754. Display area 752 is employed to display the user-accepted ideographic character(s) or the line of ideographic text being written (which includes the user-accepted ideographic characters as the user strokes and picks his way through each character).

Touch-sensitive area 754 includes a candidate-choice display area comprising a plurality of candidate-choice display locations, which are arranged as a matrix of 3 rows by 7 candidate-choice display locations. These candidate-choice display locations are referenced from A1–C7 as shown in FIG. 7B.

Touch-sensitive area 754 also includes a stroke input area 756, representing the touch-sensitive area where the user may enter the input strokes for the character. Stroke input area 756 may include visual markings, such as the lines dividing stroke input area 756 into four quadrants, to aid the user in entering strokes.

When the user enters the strokes by writing on stroke input area 756, the electronic device receives the strokes entered and categorizes them according to shape, input sequence, and at least one of location and size (or both) in the manner described earlier. After a few strokes are entered (for example, two strokes as in one preferred embodiment), the first list of candidate incomplete and/or complete characters are displayed in the candidate-choice display locations. Using the earlier example of FIG. 2, the candidate choices 208, 206, and 210 may be displayed in locations A1, A2, and A3 respectively, for example. If the user picks the complete character 206 (e.g., by touching the touch-sensitive area A2 or activating a key on a keyboard), this complete character is immediately moved to display area 752, and the inputting process for the current character is complete.

Since candidate choices 208 and 210 are incomplete characters, there may be visual cues (such as a different font formatting, font color, or background color) to signal to the user that these candidate choices are associated with incomplete characters. If the user selects either incomplete character 208 or 210, the next list of candidate incomplete and/or complete character choices associated with the selected incomplete character may then be displayed in row B. For example, if the user selects the incomplete character 210, the next list of candidate choices 222 and 224 will be displayed in candidate-choice display locations B1 and B2 respectively. Since both of these are complete characters in the example of FIG. 2, the subsequent selection of either of these candidate choices will end the inputting process for the current character.

On the other hand, if the user selects the incomplete character 208 instead of the incomplete character 210 in row A, the list of candidate choices 234, 236, 238, 240, 242, 244 and the "MORE" choice 232 may be displayed in row B instead. If the user selects the "MORE" choice, additional candidate choices may displace the current candidate choices in row B or they may be displayed in row C. On the other hand, if the user selects any of the incomplete characters in this list of candidate choices in row B, the next associated list of candidate choices may appear in row C. If one of the incomplete characters in row C is selected the next time, the rows may scroll upward (and a scroll bar may be provided) so that the next associated list of candidate choices may be displayed in the last row, i.e., row C. The process continues until the user picks a complete character.

The use of a matrix to display the candidate choices renders it simple for the user to employ the "look-ahead" capability of the present invention. For example, the user may select the incomplete character 210 first in location A3 of row A to "peek" ahead at the next list of candidate choices as these candidate choices are displayed in row B. If none of the choices are acceptable, the user may, at this point, quite rapidly select an alternate choice, such as the incomplete character 208 in location A1 of row A, which selection causes a different list of candidate choices (i.e., the list associated with incomplete character 208 instead of the list associated with incomplete character 210) to be displayed in row B. The look-ahead capability is quite helpful to a user who may remember only the first few strokes of an intended character and perhaps a few more details about the intended character. By allowing the user to peek ahead at the different lists of candidate choices, the user may rapidly look at many different displayed incomplete and incomplete characters based on the initial strokes, and may be able to recognize and find the intended character, even if the user does not, by himself, remember how to write the complete character.

The use of a matrix to display the candidate choices also renders it simple to implement the back-track capability. For example, if the user selected incomplete character 208 in location A1 of row A, which selection caused the next list of candidate choices to appear in row B, and the user subsequently selected another incomplete character in row B (e.g., incomplete character 238 of FIG. 2) and saw another list of candidate choices in row C before realizing that he went down the wrong path, the user may simply return to row A to select another choice, such as incomplete character 210 in location A3 of row A, which selection now causes a different list of candidate choices to appear in row B (and clears out previously occupied row C). If the prior list has scrolled off the candidate-choice display area, the user may scroll back until the desired prior list is seen again or he may simply choose to enter the strokes again to start all over.

Note that although a matrix of 3×7 candidate-choice display locations is shown in a preferred embodiment, it is possible to implement the invention with a matrix of a different size. A greater number of rows will help reduce scrolling but will occupy more of the display screen. A greater number of columns will help reduce the need for the "more" choice in the various displayed lists of candidate choices but will also occupy more of the display screen. The right tradeoff depends on the characteristics of the specific electronic device on which the invention is implemented. Display screen area may be less of a concern for a large desktop unit but may be at a premium for a handheld PDA or cellular phone, for example.

Figure 8:
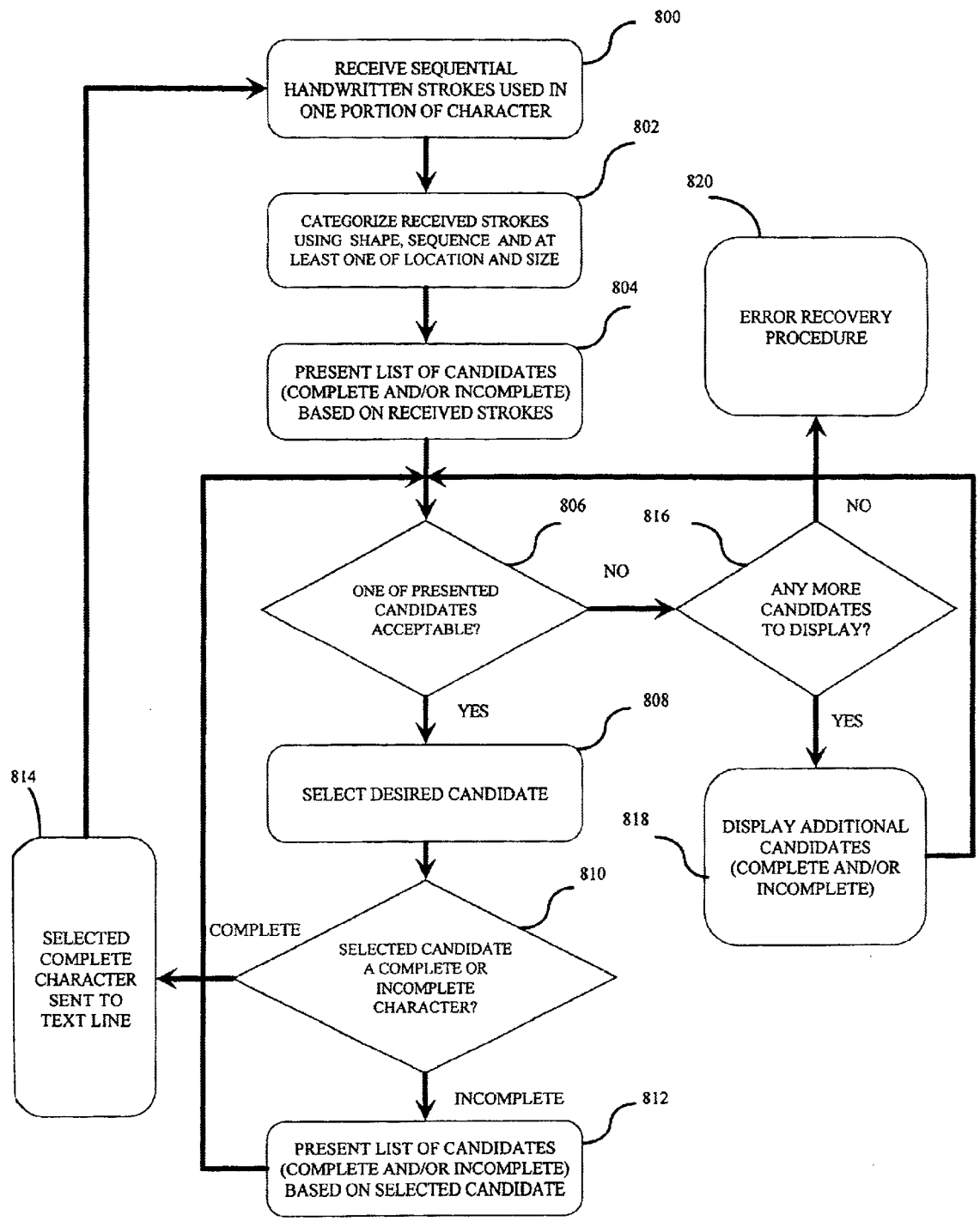
FIG. 8 shows, in accordance with one embodiment of the present invention, the steps employed in implementing the inventive character input and encoding method.

FIG. 8 shows, in accordance with one embodiment of the present invention, the steps employed in implementing the inventive character input and encoding method. In step 800, the handwritten strokes representative of one portion of a character are received in a sequential order. In step 802, the received strokes are categorized with respect to shape, sequence, and at least one of relative location and size. In step 804, the first list of selections is ascertained from the database of complete and incomplete characters using the categorized received strokes as the search criteria. In step 806, if one of the candidate selections is acceptable, the method proceeds to step 808 wherein the user picks the appropriate candidate selection. In step 810, it is ascertained whether the candidate selection picked by the user is a complete or an incomplete character. If the candidate selection picked by the user is a complete character, the process ends for the current character and the process returns to step 800 to receive handwritten strokes representative of a portion of the next character to be inputted.

On the other hand, if the candidate selection picked by the user is an incomplete character, the process proceeds to step 812 wherein another list of selections is displayed. This list of selections includes more detailed complete and incomplete characters that are based on the incomplete character previously picked. Thereafter, the process returns to step 806 to allow the user to ascertain whether one of the presented candidates in the new list is acceptable so that the user can pick his way toward completion.

In step 806, if none of the candidate selections are acceptable, the process proceeds to step 816 wherein it is ascertained whether there are any additional candidate selections to display. The actual determination of whether there are any additional candidate selections to display may be performed in advance in steps 804 or 812 during the initial display of the list of selections and the existence of additional candidate selections may manifest itself to the user in the form of the "more" button (discussed earlier in connection with FIG. 2). By way of example, the user may ascertain from the candidate selections presented in step 806 that none of the currently displayed candidate selections are acceptable. In this case, the user can hit the "More" button to cause additional candidate selections to be displayed (step 818). On the other hand, if there are no more candidate selections to be displayed and none of the currently displayed candidate selections are acceptable, the method proceeds to step 820 to perform error recovery. Error recovery may take the form of allowing the user to successively backtrack the selection process performed earlier. If necessary, the user may backtrack step-by-step all the way back to the initial handwritten stroke inputting step (step 200). Thus, if the user made an error in selection anywhere along the process, the user may backtrack to the appropriate list of selections and make the correct selection the second time around. An alternative error recovery procedure may allow the user to enter more strokes in step 200, up to and including all strokes that make up the character (in which case, the process for error recovery is essentially allowing the user to manually enter the character via handwriting). Another alternative error recovery procedure may allow the user to simply scroll through the database to pick the complete character. In fact, any alternative character input process may be employed during error recovery as well.

As can be appreciated from the foregoing, the combined techniques of inputting a few initial handwritten strokes in combination with character selection through subsequently presented lists of selections advantageously provides the user with a rapid and user-friendly way to enter ideographic characters. No prior categorization of strokes is required of the user since categorization is performed by the logic circuitry on the handwritten strokes entered by the user. Since only a few handwritten strokes are required, the possibility for error is reduced, particularly with respect to complex characters requiring a large number of strokes. The "look-ahead" characteristic of the lists of selections, which are presented after the completion of handwritten stroke input or after every user selection of an incomplete character in the previous list of selections, provides a mechanism to bridge gaps in user's knowledge and memory. If the user was unsure about the pronunciation or construction of a character, the list of candidate selections helps jog his memory so that the process of inputting the next strokes becomes a process of selecting among the candidate selections displayed, not a process of coming up with those strokes (including their location, size, shape, sequence) on his own. The use of the "more" facility, the ordering of the candidate selections in each list according to their respective frequency-of-use, and the use of incomplete characters to allow the user to work his way toward the complete character in a step-wise manner all contribute to a rapid and user-friendly character input and encoding system.

In accordance with another aspect of the present invention, there is provided an inventive technique for encoding the handwritten stroke sequence such that the attributes of each handwritten input stroke (e.g., shape, sequence, and optionally size, and location) can be efficiently encoded into a handwritten stroke code sequence. The handwritten stroke code sequence can then be efficiently employed as a search key to obtain the initial list of candidate selections from a database. Concomitantly, there is also provided an innovative technique for pre-processing ideographic characters into encoded sequences representing attributes of strokes of complete and incomplete characters and for organizing these encoded sequences in the database. The pre-processing may also capture the frequency-of-use information for the complete and incomplete characters to allow the most likely candidate complete/incomplete characters to be presented to the user for selection. More importantly, the pre-processing organizes the database to facilitate the database searching process that outputs the various lists of candidate selections responsive either to the user's handwritten input strokes and/or to the user's subsequent selection of an incomplete character from a list of candidate selections.

In one embodiment, as the user enters the initial strokes, each stroke is classified according to shape, sequence, size and location. Once classification is complete and the shape, sequence, size, and location information of a stroke is determined, this information is encoded stroke-by-stroke to form the handwritten stroke code sequence. If the user is attempting to input a Chinese character, the shape of a given handwritten stroke may be classified into one of six different shape categories: a vertical stroke, a horizontal stroke, a left downward slope stroke, a right downward slope stroke, an upper right corner, or a lower left corner. These six shapes are shown in FIGS. 9A–9F respectively.

Further, the size of a given handwritten stroke may be classified to be one of three sizes: large, medium, or small. A given stroke may be determined to be a large stroke if its size is above a certain large-stroke-size threshold. A given stroke may be deemed a medium stroke if its size falls in between the medium-stroke-size threshold and the large-stroke-size threshold. A given stroke may be deemed a small stroke if its size falls below the medium-stroke-size threshold, for example.

These size thresholds of course depend on the shape of the stroke under categorization and may vary among ideographic languages. For example, a vertical stroke in Chinese may be deemed a large stroke if it exceeds, for example, $2/3$ (the exact value of the threshold of course may vary depending on the implementation) of the height of the character input area, i.e., the conceptual, imaginary square box within which the character is written. The same vertical stroke may be deemed a medium stroke if its size is between, for example, $1/3$ and $2/3$ of the height of the character input area. The same vertical stroke may be deemed a small stroke if its size is below, for example, $1/3$ of the height of the character input area, for example. However, a left downward stroke or a right downward stroke may have a different large-stroke-size threshold and a different medium-stroke-size threshold.

In this example, there are 18 possible combinations of stroke shapes and stroke sizes (i.e., 6 shapes×3 sizes). In one embodiment, the 18 combinations are encoded by 18 different codes or 18 different bit sequences. In one preferred embodiment, the 18 combinations of Chinese stroke shapes and stroke sizes are encoded by 18 different Roman alphanumeric characters, or more preferably 18 different Roman alphabetic (i.e., a–z and A–Z) characters. For convenience, the small and large sizes of a given stroke may be encoded with the small-letter and the capital-letter versions of the same Roman alphabetic character (e.g., "A" and "a" for large and small vertical strokes, respectively). The medium size of the same stroke may be encoded by another Roman alphabetic character (which may be either the small-letter version or the capital-letter version).

FIG. 10 shows the encoding of the 18 combinations of Chinese stroke shapes and stroke sizes of the exemplary implementation. Note that the encoding scheme is not restricted to that shown in the exemplary embodiment of FIG. 10. As one example, the stroke shapes shown in FIG. 10 are only exemplary, and each of the six stroke shapes discussed may encompass different variations of the basic exemplary shape(s) shown. One skilled in the art will readily recognize that many other shapes can be encoded with their own unique codes. For example, stroke shapes other than the six stroke shapes discussed above may be employed for categorization and each may be given its own unique code during the encoding process. As another example, each of the three different upper right corner shapes of FIG. 10 may be encoded with its own code. As another example, characters in another ideographic language (e.g., Korean, Japanese, or Arabic) may involve some stroke shapes different from those commonly encountered in Chinese characters. It should also be noted that the stroke size may be categorized with a greater number of size categories. Instead of only three size categories (i.e., large, medium, and small), a stroke may be categorized as belonging to one of 5 or 7 or 10 or any arbitrary number of size categories. Thus the exact encoding scheme may be both language-dependent and implementation-specific within the guidelines given herein.

Figure 11A:
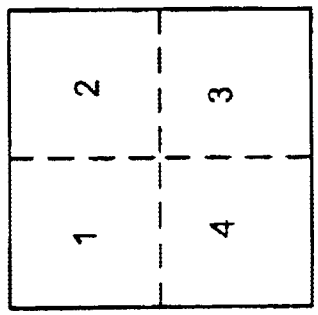
FIG. 11A illustrates, in accordance with one embodiment of the present invention, an encoding scheme for the four quadrants of a character input area.

A stroke's starting point may be determined to be in one of the input zones within the character input area. In general, the character input area (e.g., the imaginary square box within which a Chinese character is written) may be divided into many different input zones, each of which may be encoded with a different code. Thus, if a character input area is divided into 9 different zones, different codes may be employed to encode each of these input zones. More preferably, the character input area is divided into four quadrants and encoded with four different codes. In a preferred embodiment, each input zone is encoded with an alphanumeric character or more preferably, with a number. Thus, in the case where the character input area is divided into four quadrants, the first quadrant may be encoded with a "1", the second quadrant may be encoded with a "2" and so on. This encoding is shown in FIG. 11A.

Figure 11B:
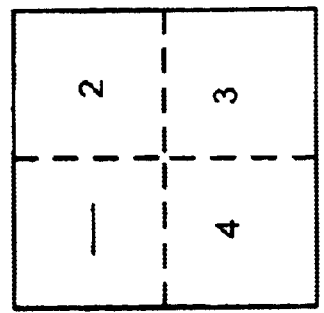
FIG. 11B illustrates, in accordance with another embodiment of the present invention, an alternative encoding scheme for the four quadrants of a character input area.

In one particularly advantageous embodiment, the first quadrant is left unencoded. This encoding scheme is shown in FIG. 11B. Thus, when a stroke starts in the first quadrant, nothing is encoded for that location information and it is understood, by the absence of a code representing the location (such as the absence of a "2", a "3" or a "4"), that the starting location of the stroke is in the first quadrant. This form of encoding advantageously saves memory space since many of the strokes are either located in or start in the first quadrant. The saving in memory space is particularly significant given the large number of Chinese characters that need to be encoded and stored in the database to facilitate the searching process.

In one embodiment, only the starting location of a stroke is encoded. In other words, the ending location of the stroke (or more accurately, the input zone within which the stroke ends) is not encoded. It is felt by the inventors herein that the starting location information, in combination with information about stroke shape and stroke size, is sufficient to uniquely represent a stroke. Since the stroke ending location is not stored, a significant saving in memory space is also realized.

Thus, in one embodiment, each stroke may be coded with a 2-character code group. The first character of the two-character code group contains the stroke shape and stroke size information (i.e., by assigning one character for each of the possible shape/size combination). The second character indicates the starting location of the stroke. The absence of the second character representing the starting location of a stroke, in one embodiment, indicates that the starting location for the stroke under categorization is in the first quadrant.

With respect to sequence information, the order in which the strokes are entered by the user is reflected in the order of the 2-character code groups within the overall handwritten stroke code sequence. Using the coding implementation of FIG. 10 and FIG. 11B, if the user enters a medium horizontal stroke that starts in the first quadrant and then a short vertical stroke that also starts in the first quadrant, the encoding for these two strokes may be "Ma", wherein the code "M" represents the medium horizontal stroke that is entered first in time and the code "a" represents the subsequently entered short vertical stroke. The absence of any location information in connection with the code "M" indicates that the first medium horizontal stroke starts in the first quadrant. Likewise, the absence of any location information in connection with the code "a" indicates that the subsequently entered short vertical stroke also starts in the first quadrant. Note that had the encoding results in the input code sequence "aM", this would have represented the entry of a short vertical stroke that starts in the first quadrant, to be followed in time by the entry of a medium horizontal stroke that also starts in the first quadrant. Thus the order of the code groups in the code sequence imparts information pertaining to the temporal order of stroke entry.

Once the handwritten stroke code sequence is obtained, that sequence is then employed as a search key to search through a database of complete and incomplete characters, or more specifically to search through a database of code sequences representing complete and incomplete characters. As mentioned previously, the characters in a particularly ideographic language is preferably pre-processed into code sequences and organized in a database to facilitate searching.

The complete characters in a particular ideographic language, e.g., Chinese, may be pre-processed to obtain a code sequence for each complete character. Each of the pre-processed code sequence representing a complete character is an encoding of various attributes of the strokes that form its respective associated complete character. These attributes may be, for example, the shape, sequence, and optionally location, and size of the constituent strokes.

Incomplete characters are chosen from groups of complete characters that have a group of strokes in common. Given the vast number of complete characters in each ideographic language, there are of course many ways to group the complete characters. Thus, depending on how the complete characters are grouped, the common group of strokes (i.e., the incomplete characters) may vary from implementation to implementation. In general, an incomplete character may include any number of strokes starting with the first stroke of the character, up to n−1 strokes where (n) is the total number of strokes in the character. Thus, an incomplete character does not have to correspond with an element or a radical, as these terms are used in the art, in the ideographic character but may be any arbitrarily convenient subset of the strokes forming the complete character.

In one embodiment, the process of determining the incomplete strokes for inclusion in the database is a hierarchical break-down process starting from the dictionary of all available complete characters. For a given dictionary of complete characters, the incomplete characters may be chosen in view of 1) the number of strokes one must enter to enable the system to begin searching for the candidate characters (incomplete/complete), 2) the approximate maximum number of candidate characters (incomplete/complete) per hierarchy, and 2) the approximate maximum number of selection steps one is allowed to make before being presented with a complete character. Thus, if the system requires two handwritten strokes to start the process of candidate character selection, the dictionary may first be divided into groups of complete characters according to their initial two strokes.

Within each group of complete characters so divided, one may, in accordance with one embodiment, empirically determine the various sets of common denominator strokes that will yield a reasonable number of subgroups, each of the subgroups being represented by it own set of common denominator strokes. This determination may be made by visually inspecting the complete ideographic characters in the dictionary, or more readily, by inspecting the database of code sequences representing the complete characters.

The total number of subgroups should be a balance between the desired number of candidate choices at this first level of the hierarchy (i.e., one level below the parent level, which parent level is represented by the two initial strokes) and the maximum number of selection steps allowable before being presented with a complete character. By varying the sets of common denominator strokes, the size of the various subgroups will change, and concomitantly the maximum number of selection steps required. For example, if the sets of common denominator strokes are selected such that one of the subgroups has a large number of subgroup members, it may take an unduly large number of selection steps to arrive at a given complete character in that subgroup (since that subgroup will need to be hierarchically broken down further). On the other hand, if the sets of common denominator strokes are selected such that each subgroup has only a few members, the number of candidate selections at this level of hierarchy may be unduly large even though none of the candidate selections presented would require the user to make a large number of selection steps before arriving at the complete character desired.

Each set of common denominator strokes is thus presented either as a complete candidate characters (if its constituent common denominator strokes, together with the two initial strokes, form a complete character) or as an incomplete candidate character (if its constituent common denominator strokes, together with the two initial strokes, form an incomplete character). If any subgroup has a large number of candidate characters, it may be further broken down into sub-subgroups using the same methodology. One skilled in the art will readily recognize that the process of choosing the incomplete characters for inclusion in the database is one that is empirical and requires judgment, and varies widely from ideographic language to ideographic language. Thus, the methodology discussed herein is only exemplary, and many different ways of grouping characters and ascertaining the appropriate incomplete characters from a dictionary of complete characters for a given ideographic language are possible.

The incomplete characters are also pre-processed to obtain code sequences that encode the attributes (e.g., shape, sequence, and optionally location, and size) of their constituent strokes. The encoding scheme for these complete and incomplete characters may follow that described in connection with encoding the handwritten input strokes.

The code sequences representing the complete and incomplete characters are then organized and stored in the database. Within the database, the code sequences may be organized in many different ways to facilitate rapid searching. One simple way to organize the database is to sort the code sequences according to their alphanumeric constituent codes and optionally by their frequency of use. Thus, the searching process becomes a process of finding all code sequences that contain the encoded user input sequence in the appropriate position within each code sequence. These matching code sequences are the candidate complete and incomplete characters to be presented to the user. To make the system more user friendly, only a few of the more frequently occurring candidates may be presented at a time.

If the user chooses a candidate that represents a complete character, that selection ends the character input process for the current character. If the user chooses one of the candidate incomplete characters presented, the code sequence associated with the chosen candidate incomplete character would be employed to search through the database of code sequences again to find the next list of candidate complete and incomplete characters. Each time the user chooses a candidate, the code sequence is longer, and fewer and fewer candidates are obtained. At some point, the list of candidates narrows down to include the intended complete character, which is then presented for user selection.

Figure 12:
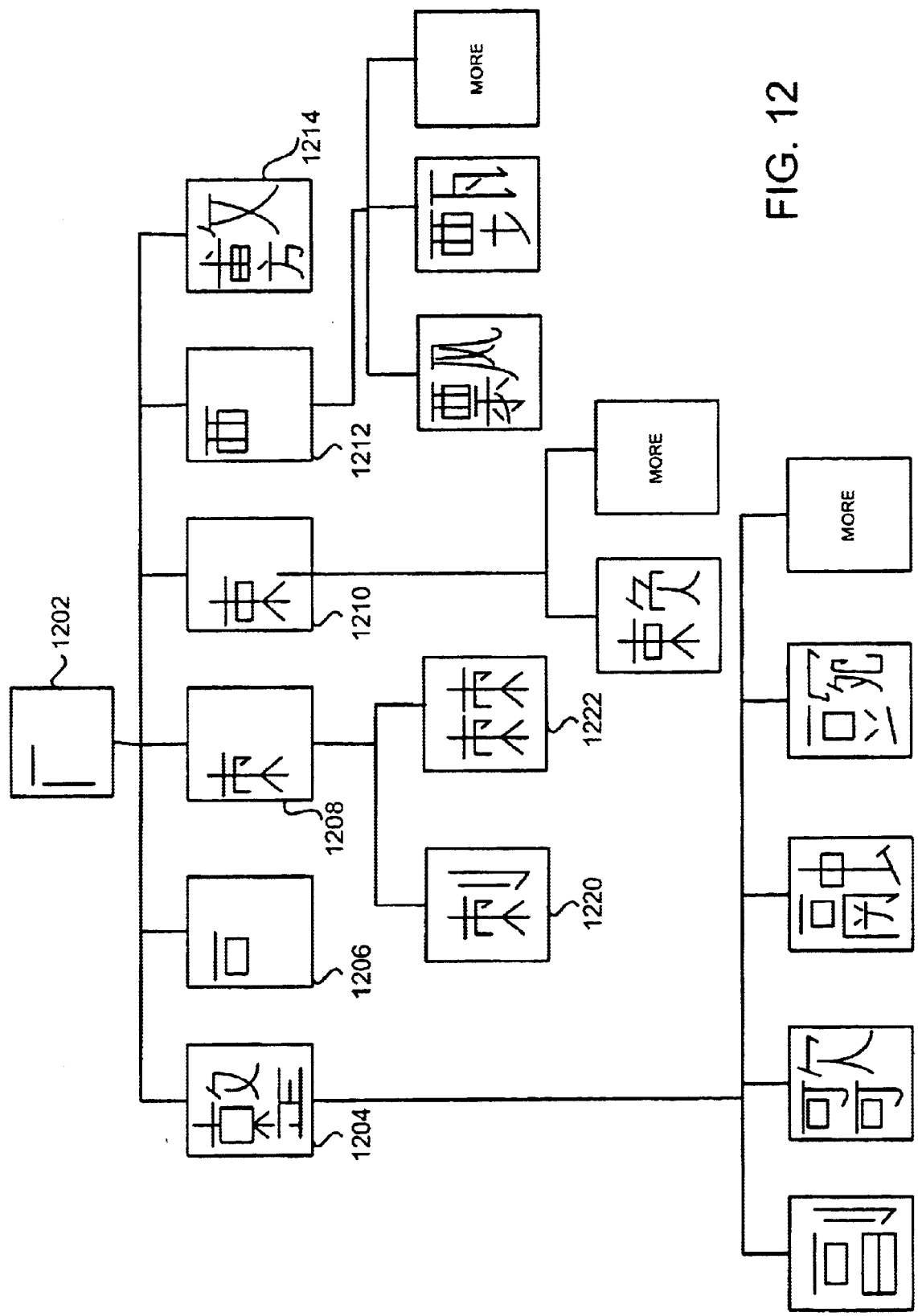
FIG. 12 illustrates, in accordance with one embodiment of the present invention, a graphical representation of an exemplary database for a plurality of code sequences.

A more efficient database arrangement employs the user of pointers. In such an arrangement, a code sequence that represent a given handwritten stroke code sequence (e.g., the code sequence representing the two handwritten strokes entered by the user if the system is configured to begin searching through the database after two handwritten strokes are inputted) may have one or more pointers linking it to its child code sequences. These child code sequences are code sequences representing the complete and incomplete characters that contain the given handwritten stroke code sequence in the appropriate position. With reference to FIG. 12, the code sequence representing the handwritten strokes shown in box 1202 has pointers to the code sequences representing the complete and incomplete characters shown in box 1204, 1206, 1028, 1210, 1212, and 1214.

A child code sequence representing an incomplete character also may have one or more pointers linking that incomplete character child code sequence to one or more grandchild code sequences. These grandchild code sequences are code sequences that contain the incomplete character child code sequence in the correct position. With reference to FIG. 12, the code sequence representing the incomplete character in box 1208 has pointers to code sequences representing the complete characters in boxes 1220 and 1222. If the grandchild code sequences include code sequences for one or more incomplete characters, there will be more pointers linking each incomplete character grandchild code sequence to still other grand-grandchild code sequences, and so on. The organization continues in this hierarchical manner for all possible handwritten stroke code sequences.

In the examples above, each stroke of the complete and incomplete characters are encoded and stored in the database for searching purposes. For many characters (complete or incomplete) that require storage in the database, there may be a large number of strokes that require encoding into code sequences. If all the attributes of each stroke of each complete and incomplete character in the database are encoded and stored, a large amount of storage space may be required. In one embodiment, the code sequence for a character (complete or incomplete) may be more efficiently stored by representing at least a part of that character using display location indices. Each code sequence starts with the codes that represent the attributes (e.g., shape, sequence, and optionally location, and/or size) for the user-input strokes. Thus, if the system is configured to accept (n) user-input strokes before searching for the list of candidate complete and/or incomplete characters, the code sequences in the database all start with the codes that represent the attributes of the first (n) strokes of the complete and/or incomplete characters to facilitate searching. In the preferred embodiment, the system is configured to accept 2 user-input strokes before furnishing the list of candidate complete and/or incomplete characters, and thus the code sequences in the database all start with the codes that represent the attributes of the first 2 strokes of the complete and/or incomplete characters to facilitate searching.

The rest of the codes in each code sequence is made up of display location indices that match the display locations in the candidate-choice display area (such as those shown by reference numbers A1–C7 in FIG. 7). Using the implementation discussed in connection with FIGS. 10 and 11B, the code for the medium horizontal stroke that starts in the first quadrant and the subsequent short vertical stroke that starts in the first quadrant is Ma. Thus, the code sequences for all complete and incomplete characters having as their first two strokes a medium horizontal stroke that starts in the first quadrant and a subsequent short vertical stroke that starts in the first quadrant all start with the codes Ma. All such complete and incomplete characters (i.e., those having as their first two strokes a medium horizontal stroke that starts in the first quadrant and a subsequent short vertical stroke that starts in the first quadrant) are further pre-processed to determine in advance, based on frequency-of-use information for example, the column number of their display locations within the candidate choice display matrix.

Figures 13A, 13B:
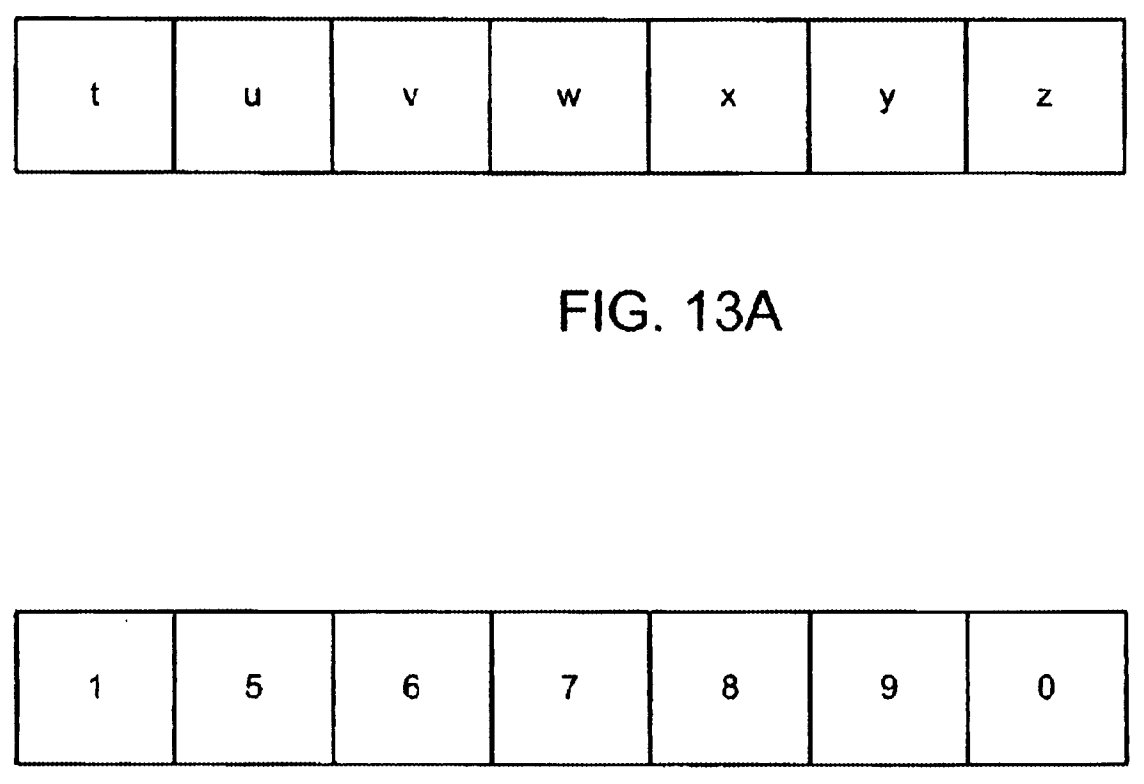

The preferred embodiment may be better understood with reference to FIGS. 13A, 13B, and 14. Suppose the candidate complete and incomplete characters are shown to the users in groups of 7 (maximum) at a time. Thus, there are a maximum of 7 possible display locations to display the candidate complete and complete characters responsive to the user's handwritten strokes or to the user's selection of an incomplete character. The user is invited to refer back to the example of FIG. 7B to review the matrix of 3×7 display locations in display screen 750 therein. Each of the 7 display locations may be assigned in advance a display location index. Thus, as shown in FIG. 13A, the display locations 1–7 are assigned display location indices t, u, v, w, x, y, and z. In the general case, the display location indices are represented by arbitrary codes that are different from those employed to encode the shape/size and location of the strokes. In the preferred embodiment of FIG. 13B, the display locations 1–7 are assigned display location indices 1, 5, 6, 7, 8, 9, 0 since the numbers 2, 3, and 4 are reserved for coding the stroke starting locations as discussed earlier.

Since the complete and incomplete characters starting with the codes Ma are pre-processed to determine in advance their respective display locations, these complete and incomplete characters may be encoded with the display location indices. Thus, the seven characters determined in advance to be displayed should the user enters the handwritten strokes that are encoded into the handwritten stroke code sequence "Ma" are encoded Mat, Mau, May, Maw, Max, May, and Maz (using the example of FIG. 13A) or Ma1, Ma5, Ma6, Ma7, Ma8, Ma9, and Ma0 (using the example of FIG. 13B). If the list of candidates is greater than 7 (or any number of display locations implemented), the additional list of candidates that would be displayed if the "more-to-display" selection is chosen may be pre-processed in an analogous manner.

If Ma6 is the code sequence representing a child incomplete character (such as the incomplete character shown in box 1208 of FIG. 12), its own child candidate complete and incomplete characters may be pre-processed to determine in advance the display locations, and the display location indices may be employed to encode its child candidate characters (i.e., the grandchild candidate characters of the original handwritten stroke code sequence Ma). Thus, if Ma6 is the code sequence representing the child incomplete character shown in box 1208 of FIG. 12, its own two child candidate characters (shown in box 1220 and 1222 of FIG. 12) may be encoded Ma61 and Ma65 respectively, wherein the appended codes "1" and "5" to the parent code "Ma6" indicate the respective first and second display locations (as shown in the example of FIG. 13B). Thus, after the first list of candidate complete and incomplete characters represented by the codes Ma1, Ma5, Ma6, Ma7, Ma8, Ma9, and Ma0 are displayed in display locations 1–7 respectively, if the user chooses the incomplete character represented by the code sequence Ma6 (i.e., by selecting the third display location), the code Ma6 is employed to search for other code sequences that start with "Ma6." On the other hand, if the user chooses a complete character, the character input process ends for the current character. Within the database, the code sequences may be organized in any manner, including by being organized in a sorted order or using pointers.

As can be appreciated from the foregoing, since part of the code sequence is stored with the display location indices instead of with codes describing attributes for each of the strokes in the character (complete/incomplete), the amount of storage is dramatically reduced. The saving is particularly significant since even the most complicated character typically takes only a few selections to acquire (and thus requiring the storage of only a few display location indices in addition to the initial handwritten stroke code sequence). If all the strokes of one of these complicated characters are encoded to describe their attributes in the code sequence, the resultant code sequence would have been much longer, and would have required much more memory space to store. If one multiplies the saving over the thousands of characters in a typical ideographic language, the total amount of saving is significant. In fact, such saving may make it possible to implement the entire database within the small memory space of an electronic handheld device.

While this invention has been described in terms of several preferred embodiments, there are alterations, permutations, and equivalents which fall within the scope of this invention. It should also be noted that there are many alternative ways of implementing the methods and apparatuses of the present invention. It is following appended claims be interpreted as including all ns, and equivalents as fall within the true spirit and scope

What is claimed is:

1. A computer-implemented method for encoding a sequence of handwritten strokes representative of constituent strokes of an ideographic character to obtain an encoded input sequence, comprising:

ascertaining a shape of a first stroke of said sequence of handwritten strokes;

ascertaining a size of said first stroke;

assigning a first code to said encoded input sequence responsive to a determination of said shape of said first stroke and a determination of said size of said first stroke, said first code being predefined to represent said shape of said first stroke and said size of said first stroke, said first code being sufficiently unique to distinguish said first code from other codes representing other permutations of shape and size of said first stroke;

ascertaining a shape of a second stroke of said sequence of handwritten strokes, said second stroke being entered subsequent to an entry of said first stroke;

ascertaining a size of said second stroke of said sequence of handwritten strokes; and assigning a second code to said encoded input sequence responsive to a determination of said shape of said second stroke and a determination of said size of said second stroke, said second code being predefined to represent said shape of said second stroke and said size of said second stroke, said second code being sufficiently unique to distinguish said second code from other codes representing other permutations of shape and size of said second stroke, wherein said second code follows said first code in said encoded input sequence to reflect the temporal entry sequence of said first stroke and said second stroke.

2. The computer-implemented method of claim 1 wherein said size of said first stroke is one of a large size, a medium size, and a small size with respect to said shape of said first stroke, and said size of said second stroke is one of said large size, said medium size, and said small size with respect to said shape of said second stroke.

3. The computer-implemented method of claim 1 wherein said shape of said first stroke is one of a vertical shape and a horizontal shape.

4. The computer-implemented method of claim 3 wherein said size of said first stroke is one of a large size, a medium size, and a small size.

5. The computer-implemented method of claim 3 wherein said first stroke is different from said second stroke with respect to at least one of shape and size, first code is a first single Roman alphabet character and said second code is a second single Roman alphabet character different from said first single Roman alphabet letter.

6. The computer-implemented method of claim 5 wherein said sequence of handwritten strokes is entered in a touch-sensitive input area comprising a plurality of input zones, said plurality of input zones being represented by a plurality of unique zone codes, said computer-implemented method further comprising:

ascertaining a first starting zone that contains a starting point of said first stroke, said first starting zone being one of said plurality of input zones; and assigning a third code to said encoded input sequence responsive to a determination of said first starting zone that contains said starting point of said first stroke, said third code being one of said plurality of unique zone codes, wherein said third code is associated with said first code in said encoded input sequence.

7. The computer-implemented method of claim 6 further comprising:

ascertaining a second starting zone that contains a starting point of said second stroke, said second starting zone being one of said plurality of input zones; and assigning a fourth code to said encoded input sequence responsive to a determination of said second starting zone that contains said starting point of said second stroke, said fourth code being one of said plurality of unique zone codes, wherein said fourth code is associated with said second code in said encoded input sequence.

8. The computer-implemented method of claim 6 wherein each of said plurality of unique zone codes is a single alphanumeric character.

9. The computer-implemented method of claim 6 further comprising:

ascertaining a first ending zone that contains an ending point of said first stroke, said first ending zone being one of said plurality of input zones; and assigning a fourth code to said encoded input sequence responsive to a determination of said first ending zone that contains said ending point of said first stroke, said fourth code being one of said plurality of unique zone codes, wherein said fourth code is associated with said first code in said encoded input sequence.

10. The computer-implemented method of claim 6 wherein one of said plurality of input zones is represented by an absence of a zone code, each of all other ones of said plurality of input zones is represented by a respective one of said plurality of unique zone codes.

11. The computer-implemented method of claim 1 further comprising:

ascertaining a shape of a third stroke of said sequence of handwritten strokes, said third stroke being entered subsequent to an entry of said first stroke and said second stroke;

ascertaining a size of said third stroke of said sequence of handwritten strokes; and assigning a third code to said encoded input sequence responsive to a determination of said shape of said third stroke and a determination of said size of said third stroke, said third code being predefined to represent said shape of said third stroke and said size of said third stroke, said third code being sufficiently unique to distinguish said third code from other codes representing other permutations of shape and size of said third stroke, wherein said third code follows said second code and said first code in said encoded input sequence to reflect the temporal entry sequence of said first stroke, said second stroke, and said third stroke.

12. The computer-implemented method of claim 1 wherein said ideographic character is one of a Japanese ideographic character, a Chinese ideographic character, and a Korean ideographic character.

13. A computer-implemented method for obtaining a list of candidate selections comprising at least a first incomplete ideographic character and a first complete ideographic character from a database of complete ideographic characters and incomplete ideographic characters, each of said complete ideographic characters and said incomplete ideographic characters in said database being associated with a respective one of a plurality of code sequences, each of said plurality of code sequences representing information pertaining to shape, sequence, and one of stroke location information and stroke size information for strokes of one of said complete characters and incomplete characters in said database, said first incomplete ideographic character having an associated first code sequence stored in said database, said first code sequence being one of said plurality of code sequences and representing information pertaining to shape, sequence, and one of stroke location information and stroke size information for strokes of said first incomplete characters, said first complete ideographic character having an associated second code sequence stored in said database, said second code sequence being another one of said plurality of code sequences and representing information pertaining to shape, sequence, and one of stroke location information and stroke size information for strokes of said first complete ideographic character, said computer-implemented method comprising:

receiving an encoded input sequence, said encoded input sequence representing information pertaining to shape, sequence, and one of stroke location information and stroke size information for a stroke set of a given character, the number of strokes in said stroke set is fewer than the number of strokes in said given character;

searching through said plurality of code sequences to find matched sequences, each of said matched sequences representing one of said plurality of code sequences whose codes contain at least said encoded input sequence, wherein said first code sequence and said second code sequence are among said matched sequences;

obtaining said first complete character from said first code sequence as a first candidate selection in said list of candidate selections; and obtaining said second incomplete character from said second code sequence as a second candidate selection in said list of candidate selections.

14. The computer-implemented method of claim 13 wherein both of said stroke location information and said stroke size information for strokes of individual ones of said complete characters and incomplete characters in said database are represented in said plurality of code sequences.

15. The computer-implemented method of claim 13 wherein each of said plurality of code sequences is a unique combination of alphanumeric characters.

16. The computer-implemented method of claim 13 wherein said encoded input sequence is a combination of alphanumeric characters.

17. The computer-implemented method of claim 13 wherein said codes in said first code sequence represent said information pertaining to said shape, said sequence, and said stroke size information for said strokes of said first incomplete ideographic character.

18. The computer-implemented method of claim 17 wherein said shape and said stroke size information for a given stroke of said first incomplete ideographic character are encoded by a single alphanumeric character.

19. The computer-implemented method of claim 13 wherein said codes in said second code sequence represent said information pertaining to said shape, said sequence, and both said stroke location information and said stroke size information for said strokes of said first complete ideographic character.

20. The computer-implemented method of claim 19 wherein said shape and one of said stroke location information and said stroke size information for a given stroke of said first complete ideographic character are encoded by a first single alphanumeric character, the other of said stroke location information and said stroke size information for said given stroke of said first complete ideographic character is encoded by a second single alphanumeric character, said second single alphanumeric character being associated with said first single alphanumeric character in said second code sequence.

21. The computer-implemented method of claim 19 wherein said second single alphanumeric character is adjacent said first single alphanumeric character in said second code sequence.

22. The computer-implemented method of claim 13 wherein said first complete character is one of a complete Chinese character, a complete Japanese character, and a complete Korean character.

23. The computer-implemented method of claim 22 wherein said stroke set of said given character includes a vertical stroke.

24. The computer-implemented method of claim 23 wherein said stroke size information for said vertical stroke is one of a large, medium, and small.

25. The computer-implemented method of claim 23 wherein said stroke location information for said vertical stroke only relates to a starting location of said vertical stroke.

26. The computer-implemented method of claim 22 wherein said stroke set of said given character consists of a single stroke.

27. The computer-implemented method of claim 22 wherein said stroke set of said given character consists of two strokes.

28. The computer-implemented method of claim 22 wherein said stroke set of said given character consists of at least three strokes.

29. A computer-implemented method for encoding a handwritten stroke set, each of said handwritten stroke set being representative of a constituent stroke of an ideographic character, to obtain an encoded input sequence, comprising:

ascertaining a shape of a first stroke of said handwritten stroke set;

ascertaining one of a location information and a size information pertaining to said first stroke; and assigning a first code to said encoded input sequence responsive to a determination of said shape of said first stroke and a determination of said one of said location information and said size information of said first stroke, said first code being predefined to represent said shape of said first stroke and said one of said location information and said size information of said first stroke, said first code being sufficiently unique to distinguish said first code from other codes representing other permutations of shape and said one of said location information and said size information of said first stroke.

30. The computer-implemented method of claim 29 wherein said ascertaining said one of said location information and said size information pertaining to said first stroke is ascertaining said size information pertaining to said first stroke, said first code is sufficiently unique to distinguish said first code from said other codes representing other permutations of shape and size information of said first stroke.

31. The computer-implemented method of claim 30 where said first code is a single alphanumeric character.

32. The computer-implemented method of claim 30 wherein said ideographic character is one of a Chinese character, a Japanese character, and a Korean character.

33. The computer-implemented method of claim 32 wherein said handwritten stroke set consists of a single stroke.

* * * * *

UNITED STATES PATENT AND TRADEMARK OFFICE
CERTIFICATE OF CORRECTION

PATENT NO. : 6,956,968 B1
APPLICATION NO. : 10/053876
DATED : October 18, 2005
INVENTOR(S) : Robert O'Dell, Xiao Jun Wang and Changshi Xu It is certified that error appears in the above-identified patent and that said Letters Patent is hereby corrected as shown below:

Title Page, Item (75) Inventors, second inventor, Xiao Jun "Wan" should be replaced with Xiao Jun --Wang--. The list of Inventors should appear as follows:

(75) Inventors: Robert O'Dell, Oakland, CA (US);
Xiao Jun Wang, Beijing (CN);
Changshi Xu, Calgary (CA)

Signed and Sealed this
Thirty-first Day of January, 2012

David J. Kappos
*Director of the United States Patent and Trademark Office*